United States Patent
Han et al.

(10) Patent No.: US 12,319,881 B1
(45) Date of Patent: Jun. 3, 2025

(54) CONVERTING A RENEWABLE FUEL INTERMEDIATE COMPOSITION TO FINISHED TRANSPORTATION FUEL

(71) Applicant: CHEVRON U.S.A. INC., San Ramon, CA (US)

(72) Inventors: Jinyi Han, San Ramon, CA (US); Horacio Trevino, Richmond, CA (US); Guan Dao Lei, Walnut Creek, CA (US); Sven Ivar Hommeltoft, Pleasant Hill, CA (US); Brian Crawford Adams, Oakland, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/900,256

(22) Filed: Sep. 27, 2024

(51) Int. Cl.
C10G 67/02 (2006.01)

(52) U.S. Cl.
CPC ...... *C10G 67/02* (2013.01); *C10G 2300/1011* (2013.01); *C10G 2300/4006* (2013.01); *C10G 2300/4012* (2013.01); *C10G 2300/4018* (2013.01)

(58) Field of Classification Search
CPC ............ C10G 67/02; C10G 2300/1011; C10G 2300/4006; C10G 2300/4012; C10G 2300/4018; C10G 69/02; C10G 2300/1055; C10G 2400/08
See application file for complete search history.

(56) References Cited

U.S. PATENT DOCUMENTS

| | | |
|---|---|---|
| 4,645,585 A | 2/1987 | White |
| 7,998,339 B2 | 8/2011 | Myllyoja et al. |
| 8,350,102 B2 | 1/2013 | Roberts, IV et al. |
| 8,354,065 B1 | 1/2013 | Sexton et al. |
| 9,580,657 B2 | 2/2017 | Heydenrych et al. |

(Continued)

FOREIGN PATENT DOCUMENTS

| | | | |
|---|---|---|---|
| FI | 20205954 A1 | * | 3/2022 |
| FI | 20225933 A1 | * | 4/2024 |

(Continued)

OTHER PUBLICATIONS

Glowka et al (Sustainable aviation fuel—Comprehensive study on highly selective isomerization route towards HEFA based bio-additives). (Year: 2024).*

(Continued)

*Primary Examiner* — Randy Boyer
*Assistant Examiner* — Juan C Valencia
(74) *Attorney, Agent, or Firm* — Sheppard, Mullin, Richter & Hampton LLP; Jaime D. Choi

(57) ABSTRACT

Methods and systems for converting a renewable fuel intermediate composition to finished transportation fuel are provided herein. In some examples, a renewable fuel intermediate composition is flowed over a first catalyst in a first reaction zone to generate a saturated, hydrodeoxygenated product. A liquid portion of the renewable fuel intermediate composition may be characterized as having more than about 70 wt % of the oxygen being within ketone groups. The saturated, hydrodeoxygenated product may be flowed over a second fixed-bed catalyst in a second reaction zone to generate a product including the finished transportation fuel.

33 Claims, 6 Drawing Sheets

(56) References Cited

U.S. PATENT DOCUMENTS

| | | |
|---|---|---|
| 9,903,584 B2 | 2/2018 | Fan et al. |
| 10,190,059 B2 | 1/2019 | Chapus et al. |
| 11,479,725 B2 | 10/2022 | Amblard et al. |
| 11,555,153 B1 | 1/2023 | Hommeltoft |
| 11,912,947 B1 | 2/2024 | Hommeltoft |
| 12,139,673 B2 * | 11/2024 | Andersson ............. C10G 47/20 |
| 2009/0000185 A1 | 1/2009 | Aulich et al. |
| 2009/0158637 A1 | 1/2009 | McCall et al. |
| 2011/0054230 A1 * | 3/2011 | Cole ................. C10G 3/45 |
| | | 585/240 |
| 2011/0056869 A1 | 3/2011 | Novak et al. |
| 2011/0237853 A1 | 9/2011 | Hamamatsu et al. |
| 2012/0137572 A1 | 6/2012 | Bartek et al. |
| 2012/0203042 A1 | 8/2012 | Huber et al. |
| 2012/0238787 A1 | 9/2012 | Gruber et al. |
| 2012/0244585 A1 | 9/2012 | Kale et al. |
| 2012/0316093 A1 | 12/2012 | Zhan et al. |
| 2013/0338409 A1 | 12/2013 | Trewalla et al. |
| 2014/0012025 A1 | 1/2014 | Sohling et al. |
| 2014/0123973 A1 | 5/2014 | North |
| 2014/0163285 A1 | 6/2014 | Buchanan et al. |
| 2015/0087861 A1 | 3/2015 | Devaux et al. |
| 2015/0141703 A1 | 5/2015 | Dubois |
| 2018/0258349 A1 | 9/2018 | Heydenrych |
| 2019/0185759 A1 | 6/2019 | Kanervo et al. |
| 2021/0179952 A1 | 6/2021 | Tsuto et al. |
| 2022/0041938 A1 | 2/2022 | Hommeltoft |
| 2022/0049172 A1 | 2/2022 | Tiitta et al. |
| 2024/0157320 A1 | 5/2024 | Song et al. |
| 2024/0218261 A1 | 7/2024 | Hommeltoft |

FOREIGN PATENT DOCUMENTS

| | | |
|---|---|---|
| WO | 2008/152199 | 12/2008 |
| WO | 2009130392 | 10/2009 |
| WO | 2014/089131 | 6/2014 |
| WO | 2015/148412 | 10/2015 |
| WO | 2023/066738 | 4/2023 |

OTHER PUBLICATIONS

International Search Report & Written Opinion dated Oct. 28, 2024 for International Application No. PCT/US2024/038085, 14 pages.

Mu et al., "Optimum design of radial flow moving-bed reactors based on a mathematical hydrodynamic model," Chemical Engineering and Processing 42 (2003), pp. 409-417.

M. Renz, "Ketonization of Carboxylic Acids by Decarbooxylation: Mechanism and Scope," Eur. J. Org. Chem. 2005, 979-988.

Shirzad et al., "Moving Bed Reactors: Challenges and Progress of Experimental and Theoretical Studies in a Century of Research," Ind. Eng. Chem. Res. 58 (2019), pp. 9179-9198.

Huber et al., "Synthesis of Transportation Fuels from Biomass: Chemistry, Catalysts, and Engineering," Chem. Rev. (2006), 106, 4044-4098.

Gibon et al., "Palm oil refining," Eur. J. Lipid. Sci. Technol. 109 (2007), 315-335.

* cited by examiner

CONVERTING A RENEWABLE FUEL INTERMEDIATE COMPOSITION TO FINISHED TRANSPORTATION FUEL

FIELD

This application generally relates to renewable fuels.

BACKGROUND

There is an increasing interest in using lipid feedstocks, such as derived from plants, algae, animals, or microbiological organisms, to generate renewable fuels to replace or supplement fossil fuels. However, it may require several steps to convert a lipid feedstock to a renewable fuel, which may increase the time and expense of such conversion.

SUMMARY

Methods and systems for converting renewable fuel intermediate compositions to finished transportation fuel are provided herein.

Some examples herein provide a method of generating finished transportation fuel. The method may include (a) flowing a renewable fuel intermediate composition over a first fixed-bed catalyst in a first reaction zone to generate a saturated, hydrodeoxygenated product. A liquid portion of the renewable fuel intermediate composition may be characterized as having more than about 70 wt % of the oxygen being within ketone groups. The method may include (b) flowing the saturated, hydrodeoxygenated product of operation (a) over a second fixed-bed catalyst in a second reaction zone to generate an isomerized product including the finished transportation fuel.

In some examples, the method further includes distilling the product including the finished transportation fuel to obtain a fraction that consists essentially of the finished transportation fuel.

In some examples, the first and second reaction zones are commonly located in a first reaction vessel.

In some examples, the first and second reaction zones are located in different reaction vessels than one another and are directly coupled to one another via piping, without any intervening processing.

In some examples, the first reaction zone includes a first region having the first fixed-bed catalyst under a first set of reaction conditions and a second region having the first fixed-bed catalyst under a second set of reaction conditions.

In some examples, the first and second reaction zones are at substantially the same pressure as one another.

In some examples, the first and second reaction zones are at different temperatures than one another.

In some examples, a temperature of the renewable fuel intermediate composition entering the first reaction zone is about 50-600° F. lower than a temperature of the saturated, hydrodeoxygenated product of operation (a) entering the second reaction zone.

In some examples, a temperature of the renewable fuel intermediate composition entering the first reaction zone is about 100° F. to about 300° F. In some examples, a temperature of the renewable fuel intermediate composition entering the first reaction zone is about 150° F. to about 250° F.

In some examples, liquid hourly space rates in the first and second reaction zones are different than one another.

In some examples, the product including the finished transportation fuel has a flash point of more than about 38° C.

In some examples, the product including the finished transportation fuel has a freeze point of less than about −40° C.

In some examples, the finished transportation fuel has a freeze point of less than about −40° C.

In some examples, the finished transportation fuel has a freeze point of less than about −47° C.

In some examples, the finished transportation fuel includes at least about 40 wt % of the product including the finished transportation fuel.

In some examples, the finished transportation fuel includes at least about 70 wt % of the product including the finished transportation fuel.

In some examples, the renewable fuel intermediate composition consists essentially of a distillation fraction having a boiling point ranging from about 200° F. to about 700° F.

In some examples, the first fixed-bed catalyst used in operation (a) saturates at least 80% of olefins in the renewable fuel intermediate composition.

In some examples, the first fixed-bed catalyst used in operation (a) removes at least 70 wt % of oxygen from the renewable fuel intermediate composition.

In some examples, the first fixed-bed catalyst used in operation (a) includes at least one of: a noble metal, a group VI metal, a group VII metal, and a group VIII metal.

In some examples, at least a portion of operation (a) is performed at a temperature between about 200° F. and about 700° F. In some examples, at least a portion of operation (a) is performed at a temperature between about 250° F. and about 600° F. In some examples, at least a portion of operation (a) is performed at a temperature between about 250° F. and about 400° F.

In some examples, at least a portion of operation (a) is performed at a pressure between about 750 psig and about 1200 psig.

In some examples, at least a portion of operation (a) is performed at a partial pressure of hydrogen between about 750 psia and about 1000 psia.

In some examples, the second fixed-bed catalyst used in operation (b) includes a fixed-bed isomerization catalyst. In some examples, the fixed-bed isomerization catalyst includes a molecular sieve, a refractory oxide support, and at least one of: a noble metal, a group VI metal, a group VII metal, and a group VIII metal.

In some examples, operation (b) is performed at a temperature between about 550° F. and about 720° F.

In some examples, the method further includes flowing the product of operation (b) over a fixed-bed post-treatment catalyst in a third reaction zone. In some examples, the fixed-bed post-treatment catalyst includes at least one of: a noble metal, a group VI metal, a group VII metal, and a group VIII metal.

In some examples, operations (a) and (b) are performed adiabatically.

In some examples, a reaction exotherm from operation (a) provides sufficient heat to conduct operation (b).

In some examples, the method further includes generating the renewable fuel intermediate composition. In some examples, generating the renewable fuel intermediate composition includes: flowing a lipid feedstock into a second reaction vessel including a metal oxide catalyst on an oxide support; using the catalyst in the second reaction vessel to catalytically convert the lipid feedstock to an intermediate mixture; and distilling the intermediate mixture to obtain a fraction that primarily includes the renewable fuel intermediate composition.

Some examples herein provide a system for generating finished transportation fuel. The system may include a first reaction zone including a first fixed-bed catalyst configured to convert a renewable fuel intermediate composition into a saturated, hydrodeoxygenated product. The system may include a second reaction zone including a second fixed-bed catalyst configured to convert the saturated, hydrodeoxygenated product into an isomerized product including the finished transportation fuel.

In some examples, the system further includes a distillation column configured to distill the product including the finished transportation fuel to obtain a fraction that consists essentially of the finished transportation fuel.

In some examples, the first, and second reaction zones are commonly located in a first reaction vessel.

In some examples, the first and second reaction zones are located in different reaction vessels than one another and are directly coupled to one another via piping, without any intervening processing.

In some examples, the first reaction zone includes a first region having the first fixed-bed catalyst under a first set of reaction conditions, and a second region having the first fixed-bed catalyst under a second set of reaction conditions.

In some examples, the first and second reaction zones are all at substantially the same pressure as one another.

In some examples, the first and second reaction zones are at different temperatures than one another.

In some examples, a temperature of the renewable fuel intermediate composition entering the first reaction zone is about 50-600° F. lower than a temperature of the saturated, hydrodeoxygenated product entering the second reaction zone.

In some examples, a temperature of the renewable fuel intermediate composition entering the first reaction zone is about 100° F. to about 300° F. In some examples, a temperature of the renewable fuel intermediate composition entering the first reaction zone is about 150° F. to about 250° F.

In some examples, liquid hourly space rates in the first and second reaction zones are different than one another.

In some examples, the first fixed-bed catalyst in the first reaction zone is configured to saturate at least 80% of olefins in the renewable fuel intermediate composition.

In some examples, the first fixed-bed catalyst in the first reaction zone is configured to remove at least 70 wt % of oxygen from the renewable fuel intermediate composition.

In some examples, the first fixed-bed catalyst in the first reaction zone includes at least one of: a noble metal, a group VI metal, a group VII metal, and a group VIII metal.

In some examples, at least a portion of the first reaction zone is at a temperature between about 200° F. and about 700° F. In some examples, at least a portion of the first reaction zone is at a temperature between about 250° F. and about 600° F. In some examples, at least a portion of the first reaction zone is at a temperature between 250° F. and about 400° F.

In some examples, at least a portion of the first reaction zone is at a pressure between about 750 psig and about 1200 psig.

In some examples, at least a portion of the first reaction zone is at a partial pressure of hydrogen between about 750 psia and about 1000 psia.

In some examples, the second fixed-bed catalyst in the second reaction zone includes a fixed-bed isomerization catalyst. In some examples, the fixed-bed isomerization catalyst includes a molecular sieve, a refractory oxide support, and at least one of: a noble metal, a group VI metal, a group VII metal, and a group VIII metal.

In some examples, the second reaction zone is at a temperature between about 550° F. and about 720° F.

In some examples, the system further includes a third reaction zone including a fixed-bed post-treatment catalyst. In some examples, the fixed-bed post-treatment catalyst includes at least one of: a noble metal, a group VI metal, a group VII metal, and a group VIII metal.

In some examples, the first and second reaction zones are adiabatic. In some examples, a reaction exotherm from the first reaction zone provides sufficient heat to the second reaction zone to generate the product.

In some examples, the system further includes a subsystem configured to generate the renewable fuel intermediate composition. In some examples, the subsystem includes: a second reaction vessel including a metal oxide catalyst on an oxide support and configured to catalytically convert the lipid feedstock to an intermediate mixture; and a distillation column configured to distill the intermediate mixture to obtain a fraction that primarily includes the renewable fuel intermediate composition.

DETAILED DESCRIPTION

Figure 1A:
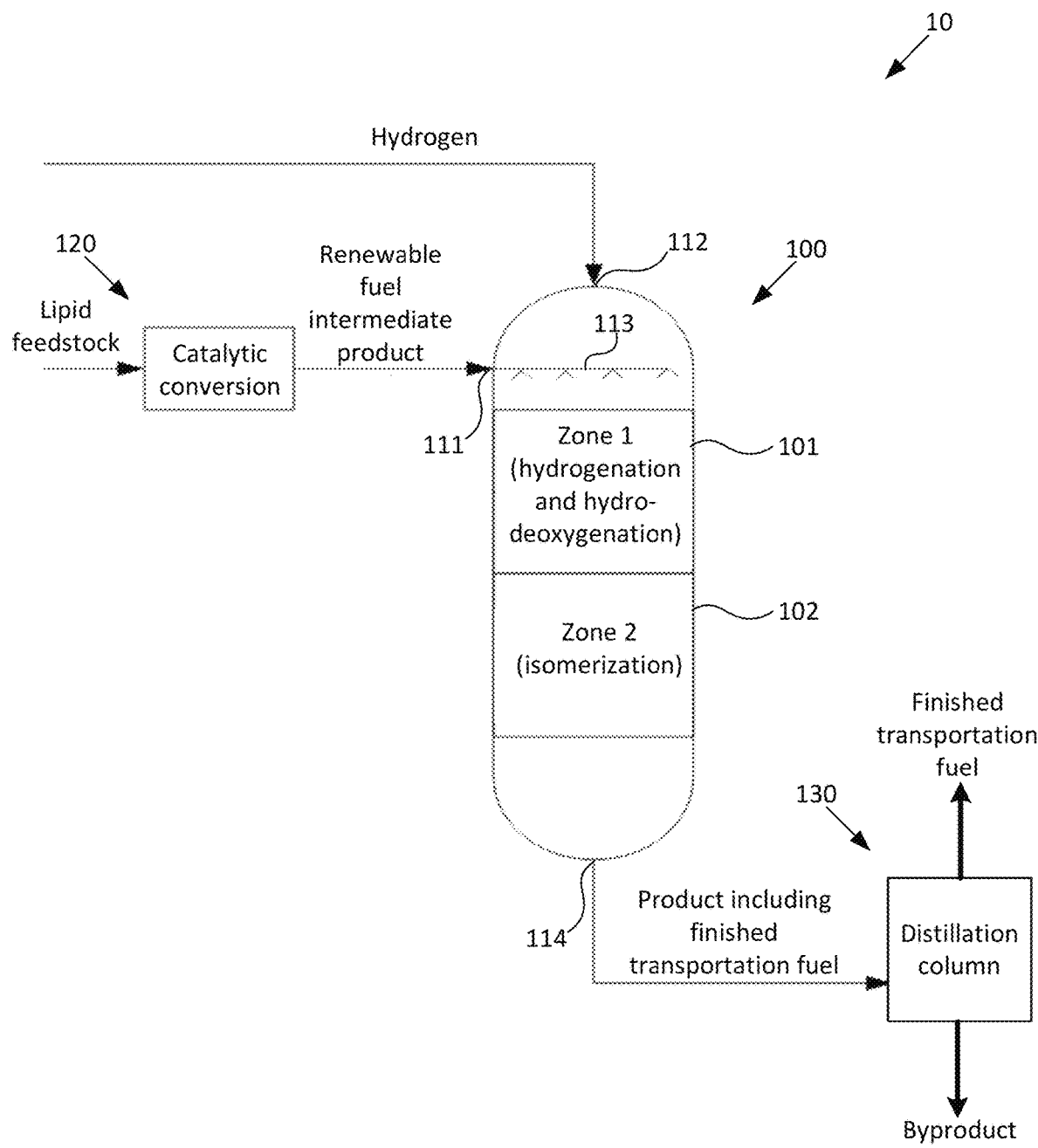
FIGS. 1A-1B schematically illustrate example systems for generating finished transportation fuel using a renewable fuel intermediate composition.

A variety of renewable lipid feedstocks may be used to generate renewable fuels, such as sustainable aviation fuel (SAF). However, such conversion previously has been performed by directly hydroprocessing a lipid feedstock using a complex sequence of reaction steps including double bond saturation, hydro-deoxygenation, hydrocracking, and hydro-isomerization. In practice, such conversion process may use several reactors operating at high pressures (e.g., well in excess of 1000 psi hydrogen pressure). Additionally, because hydrogenation is highly exothermic, the rate at which such conversion process is performed may need to be severely restricted using recycle flow, thus limiting the conversion's overall throughput, e.g., by 50% or more. Still further, the lipid feedstock may need to be extensively pretreated to remove impurities that either may passivate the hydroprocessing catalysts (e.g., metals or phosphorous) or that may challenge the metallurgy of the hydroprocessing units (e.g., chlorides). These and other limitations of directly hydroprocessing a lipid feedstock may greatly limit throughput and increase cost and complexity, thus discouraging commercial implementation of SAF.

As provided herein, the present inventors have developed methods and systems for converting a renewable fuel intermediate composition to finished transportation fuel, such as finished aviation fuel. In some examples, and as described in greater detail below, the present inventors have discovered that a renewable fuel intermediate composition may be converted in a single reactor to finished aviation fuel meeting jet fuel cold flow specifications. Other transportation fuels similarly may be produced using the present methods and systems. In some examples, the conversion may be performed in a single hydroprocessing reactor which includes multiple reaction zones, without any intermediate processing between the reaction zones. The renewable fuel intermediate composition may flow through a first reaction zone of the reactor in which a first fixed-bed catalyst performs double bond (olefin) saturation reactions and hydrodeoxygenation reactions, and then through a second reaction zone of the reactor in which a second fixed-bed catalyst performs an isomerization reaction to generate a product including the finished transportation fuel. In some examples, the conversion may be performed adiabatically, such that an exotherm from hydrogenation performed in the first zone of the reactor may provide heat for isomerization in the second zone of the reactor without the need to use a recycle flow to restrict the rate of the conversion process. Such processing of the renewable fuel intermediate composition substantially may not generate any carbon monoxide, and thus is compatible with noble metal catalysts which in some examples may be included in respective zones of the reactor. In comparison, direct hydroprocessing of lipids involves oxygen rejection, for example through the formation of water and carbon oxides. The present processing thus may be particularly useful in situations where reducing or eliminating the presence of carbon oxides is important. The conversion may be performed at less than 1000 psi hydrogen pressure, thus reducing cost and complexity of the present systems and methods as compared to conventional hydroprocessing of lipid feedstocks.

The renewable fuel intermediate composition may include significantly less oxygen than does the lipid feedstock from which the renewable fuel intermediate composition is made. This may be helpful, for example, in the second reaction zone in which the second fixed-bed catalyst is an isomerization catalyst that may combine a hydrogenation/dehydrogenation functionality with an acid functionality, the activity of which would be negatively impacted by steam formed in the first reaction zone from hydrodeoxygenation. The lower oxygen content of the renewable fuel intermediate composition reduces the formation of steam during hydrodeoxygenation, thus enhancing performance of the isomerization catalyst and reducing cost of this step. Additionally, the renewable fuel intermediate composition may include significantly fewer impurities than does the lipid feedstock from which the renewable fuel intermediate composition is made. This reduction in impurities may occur during catalytic conversion of the lipid feedstock to the renewable fuel intermediate composition, as opposed to during additional, costly pretreating steps which are specifically intended to remove impurities. As such, processing a renewable fuel intermediate feedstock may reduce or eliminate the need to separately remove impurities, thus further reducing the cost and complexity of generating the finished transportation fuel. In some examples, the renewable fuel intermediate composition may be produced from a lipid feedstock using a metal oxide catalyst on an oxide support.

Further details regarding renewable fuel intermediate compositions, and their methods of production, are provided further below.

First, some example terms will be explained. Then, non-limiting examples of the present methods and systems will be described.

Example Terms

As used herein, the term "about" is intended to mean within 10% of the stated value.

As used herein, the term "primarily" is intended to mean a majority, e.g., at least half. Illustratively, a composition which primarily has components with boiling point above a certain level, means that at least half of the composition is made up of components with boiling point about that level. The term "primarily" encompasses all ranges from at least a half to 100%, e.g., 51% or more, about 60% or more, about 70% or more, about 80% or more, about 90% or more, or about 95% or more, or about 98% of more, or about 99% or more, or about 100%.

As used herein, the term "substantially" is intended to mean significantly. Illustratively, a concentration of a component within a first composition which is substantially less than the concentration of that component within a second composition, means that the concentration of that component within the first composition is less than about 20% of the concentration within the second composition, e.g., less than about 10%, less than about 5%, less than 1%, or even less. As another example, a reaction that is performed using substantially only certain components means that of all the components which are present at the reaction, at least about 80%, at least about 90%, at least about 95%, at least about 98%, at least about 99%, or about 100% are the certain components.

As used herein, the term "lipid" is intended to refer to a fatty acid; glyceride (e.g., monoglyceride or diglyceride); glycerolipid (e.g., triglyceride, also referred to as triacylglycerol, TAG, or neutral fat); phospholipid; or phosphoglyceride (also known as glycerophospholipid);.

As used herein, the term "fatty acid" is intended to refer to a monocarboxylic acid having an aliphatic chain containing about 3 to 39 carbon atoms, illustratively about 7 to 23 carbon atoms. The aliphatic chain may be linear or branched, and may be saturated (e.g., may contain no carbon-carbon double bonds) or may be unsaturated (e.g., may contain one or more carbon-carbon double bonds).

As used herein, a "lipid feedstock" is intended to refer to a composition which is derived from a biological source, rather than from a fossil fuel source such as crude oil, shale oil, or coal, and primarily contains lipids. For example, a lipid feedstock may contain more than 50 wt % lipids, may contain more than 70 wt % lipids, may contain more than 85 wt % lipids, may contain more than 90 wt % lipids, may contain more than 95 wt % lipids, or more. A lipid feedstock may be derived from a plant, algae, animal, or microbiological organism. In some examples, a lipid feedstock may be derived from a low value waste material, side stream, by-product, residue, or sewage sludge. A lipid feedstock may be pretreated in a manner such as known in the art, for example, may be degummed, neutralized, bleached, and/or deodorized.

Depending on the source and the pretreatment (if any), a lipid feedstock may contain a mixture of different lipids. Illustratively, a lipid feedstock may include about 0-90 weight percent (wt %) of free fatty acids, about 5-100 wt % of fatty acid glycerol esters (e.g., monoglycerides, diglycerides, and/or triglycerides), and about 0-20 wt % of one or more compounds selected from the group consisting of: fatty acid esters of the non-glycerol type, fatty amides, and fatty alcohols. In some examples, the lipid feedstock may include more than about 50 wt % of free fatty acids and fatty acid glycerol esters, e.g., more than about 70 wt % of free fatty acids and fatty acid glycerol esters, or more than about 80 wt % of free fatty acids and fatty acid glycerol esters. The concentration of free fatty acids in a lipid feedstock may be characterized by determining the total acid number (TAN) of the feedstock, by measuring the mass of potassium hydroxide (KOH) in milligrams that is required to neutralize one gram of the lipid feedstock; see also ASTM D664. In some examples, a lipid feedstock may have a TAN of at least about 5 mg KOH/g, e.g., about 5-150 mg KOH/g, or about 10-150 mg KOH/g, or about 10-100 mg KOH/g, or about 10-50 mg KOH/g, or about 10-25 mg KOH/g, or about 10-20 mg KOH/g. A lipid feedstock may contain one or more impurities, such as phosphorous, silicon, chloride, an alkali metal such as sodium or potassium, an alkaline earth metal such as magnesium or calcium, a metal such as manganese or iron, or the like.

As used herein, the terms "renewable fuel intermediate composition" and "intermediate composition" are intended to refer to a liquid product that is produced from a lipid feedstock using a thermochemical process, and that may be further processed to generate a renewable fuel. In some examples, the intermediate compositions provided herein may include less than about 70 wt % of an amount of oxygen in the lipid feedstock. An intermediate composition may include oxygenated hydrocarbons such as carboxylic acids, alcohols, ketones, aldehydes, and the like. In some examples, about 10 wt % to 50 wt % of the molecules of a liquid portion of the intermediate composition includes oxygen, and about 50 wt % or more of the molecules of the liquid portion of the intermediate composition do not include oxygen. In some examples, at least about 70 wt %, or at least about 80 wt %, of the oxygen in the liquid portion of the intermediate composition is within ketone groups.

As used herein, the term "pyrolysis" is intended to refer to the thermal decomposition of organic materials in an oxygen-lean atmosphere (that is, an atmosphere containing significantly less oxygen than required for complete combustion).

As used herein, the term "hydroprocessing" is intended to refer to a process in which a composition (such as a lipid feedstock or an intermediate composition) is reacted with hydrogen in the presence of a catalyst under suitable conditions, e.g., elevated temperature and/or elevated pressure. Nonlimiting examples of hydroprocessing include hydrogenation, double bond saturation, hydrodeoxygenation, hydrocracking, hydro-isomerization, hydrodesulfurization, hydrodenitrogenation, hydrodearomatization, hydrodewaxing, and mild hydrocracking.

As used herein, the term "transportation fuel" refers to a fraction, cut, or blend of hydrocarbons having a distillation curve which is standardized for use in the transportation industry. For example, diesel fuel corresponds to a middle distillate from 160° C. to 380° C. (according to EN 590). As another example, aviation fuel corresponds to a distillate from 160° C. to 300° C. (according to ASTM D-1655). Gasoline and naphtha are other standardized, well-characterized forms of transportation fuels. When a transportation fuel is derived from a lipid feedstock (e.g., via an intermediate composition in a manner such as provided herein), then the transportation fuel may be referred to herein as a "renewable fuel." When a fuel (such as a transportation fuel, e.g., renewable fuel) is ready for use without substantial further processing, it may be referred to herein as a "final product." The final product may be conveyed to a site of use in any suitable manner, e.g., by pipeline, truck, and/or rail.

As used herein, the term "ppm" is intended to refer to parts-per-million and is a weight-relative parameter. A ppm is a microgram per gram, such that a component that is present at 10 ppm in a composition is present at 10 micrograms of the component per 1 gram of the composition.

Converting Renewable Fuel Intermediate Compositions to Finished Transportation Fuel As noted further above, conventional hydroprocessing of lipid feedstocks into transportation fuel may be complex, time consuming, and costly. The present inventors have discovered that the present systems and methods may be used to efficiently and cost-effectively convert renewable fuel intermediate compositions, which are made from lipid feedstocks, into finished transportation fuel.

Figure 1B:
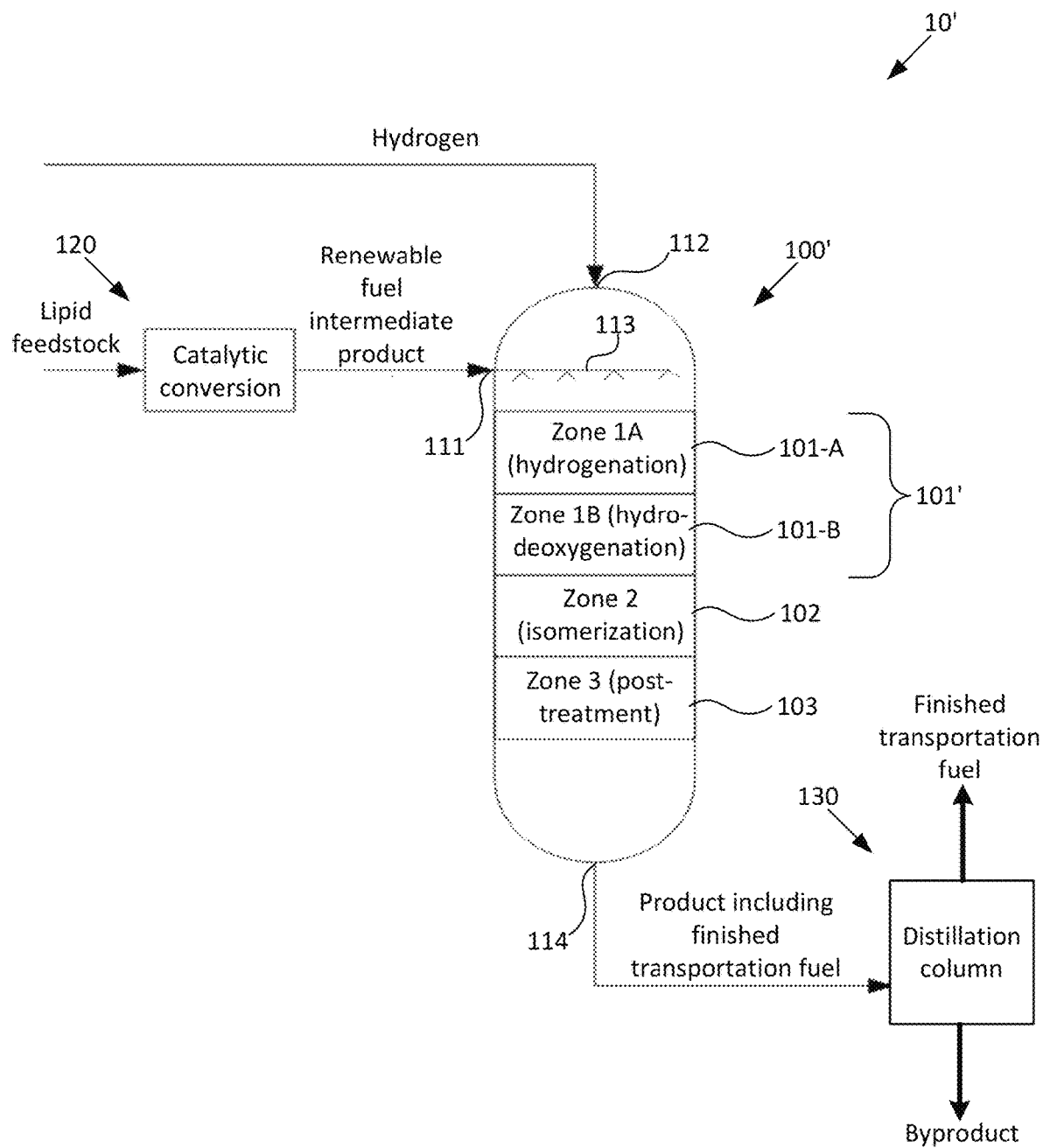

FIGS. 1A-1B schematically illustrate example systems for generating finished transportation fuel using a renewable fuel intermediate composition.

In the nonlimiting example illustrated in FIG. 1A, system 10 includes a first reaction vessel 100 and optionally also includes second reaction vessel 120. First reaction vessel 100 includes first reaction zone 101 and second reaction zone 102 which are commonly located in first reaction vessel 100. As illustrated, the first and second reaction zones 101, 102 may be vertically arranged, with the first reaction zone above the second reaction zone, optionally without any interzone separation. An optional interzone separation may be used to remove, for example, byproducts, such as water or carbon oxides, which may be detrimental to catalysts located downstream. This adds complexity to the configuration, but results in a cleaner, more favorable environment for some catalysts and operations. Alternatively, in a manner such as will be described below with reference to FIGS. 2A-2F, the first and second reaction zones 101, 102 (and optionally any optional, additional reaction zones) may be located in any suitable number of reaction vessels that are directly coupled to one another without any intervening processing, without necessarily being vertically arranged. Additionally, although FIGS. 1A and 2A-2F may suggest that the first and second reaction zones 101, 102 are of approximately equal size, this is for illustration purposes only. Regardless of the respective sizes and locations of the first and second reaction zones 101, 102, these reaction zones respectively may include fixed beds of catalysts having configurations and functionalities such as will be described, and may be coupled to one another without the need for interzone separation and/or any additional processing in between zones.

In some examples, first reaction vessel 100 may include a first inlet 111 configured to receive a renewable fuel intermediate composition, e.g., via piping which may be coupled directly to second reaction vessel 120 which is configured to generate the renewable fuel intermediate composition as in the nonlimiting example illustrated in FIG. 1A, or may be otherwise coupled to a source of the renewable fuel intermediate composition (e.g., a reservoir containing the renewable fuel intermediate composition). As such, it will be understood that system 10 optionally excludes second reaction vessel 120, and optionally does not also generate the renewable fuel intermediate composition using a lipid feedstock. The first inlet 111 may be coupled to distributor 113 configured to at least partially distribute the renewable fuel intermediate composition over the first fixed-bed catalyst of first reaction zone 101. Illustratively, distributor 113 may include manifold coupled to a plurality of spray nozzles configured to spray the renewable fuel intermediate composition over the fixed-bed catalyst of first reaction zone 101. First reaction vessel 100 also may include a second inlet 112 configured to receive hydrogen, e.g., via piping coupled to a source of hydrogen.

First reaction zone 101 may include a first fixed-bed catalyst which is configured to convert a renewable fuel intermediate composition into a saturated, hydrodeoxygenated product. A liquid portion of the renewable fuel intermediate composition may be characterized as having more than about 70 wt % of the oxygen being within ketone groups. In some examples, the first fixed-bed catalyst in the first reaction zone 101 may be configured to saturate at least 80% of olefins in the renewable fuel intermediate composition, e.g., at least about 90%, or at least about 95%, of olefins in the renewable fuel intermediate composition. Additionally, in some examples, the first fixed-bed catalyst in the first reaction zone 101 may be configured to remove at least 70 wt % of oxygen from the renewable fuel intermediate composition, e.g., at least about 80%, or at least about 90%, or at least about 95%, of oxygen from the renewable fuel intermediate composition. Any suitable catalyst(s) may be used in the first reaction zone 101. The catalyst(s) may include at least one of: a noble metal, a group VI metal, a group VII metal, and a group VIII metal. In some examples, the first fixed-bed catalyst includes a hydrogenation component and, optionally, a binder. The hydrogenation component may be or include, for example, a group VI metal, a group VII metal, or a group VIII metal, or an oxide or sulfide of a group VI metal, a group VII metal, or a group VIII metal. Nonlimiting examples include Mo, W, Co or Ni, or an oxide or sulfide of Mo, W, Co or Ni. Additionally, or alternatively, noble metal(s), such as Pt and/or Pd, may be used as hydrogenation component(s). In some examples, the hydrogenation components include noble metal(s) such as Pt and/or Pd in combination with a group VI metal, a group VII metal, or a group VIII metal, or an oxide or sulfide of a group VI metal, a group VII metal, or a group VIII metal (e.g., Mo, W, Co or Ni or an oxides or sulfide thereof). In some examples, the binder may be or include a refractory oxide support, such as alumina, silica, silica-alumina, titania, or magnesium oxide. In one nonlimiting example, the first fixed-bed catalyst in the first reaction zone 101 may include a noble metal catalyst (e.g., Pt and/or Pd in a concentration of up to about 5% by weight) on an oxide substrate (e.g., alumina).

The hydrogen and renewable fuel intermediate composition may be at any suitable temperature (or combination of temperatures) for reaction with the first fixed-bed catalyst in the first reaction zone 101 to saturate olefins in the renewable fuel intermediate composition and hydrodeoxygenate the renewable fuel intermediate composition. In some examples, the hydrogen is at a similar temperature as the renewable fuel intermediate composition entering the first reaction zone. In other, more complex examples, some of the hydrogen may be be recirculated into other reaction zones and in these cases the temperature of the hydrogen may be different than that of the renewable fuel intermediate composition, e.g., if the hydrogen performs quenching in another reaction zone.

Illustratively, a temperature of the renewable fuel intermediate composition entering the first reaction zone is about 100° F. to about 300° F., e.g., about 150° F. to about 250° F. In some examples, the first reaction zone is at a temperature between about 200° F. and about 700° F., e.g., between about 250° F. and about 600° F., e.g., between 250° F. and about 400° F. It will be appreciated that the temperature may vary across the first reaction zone. Additionally, the first reaction zone 101 may be adiabatic, such that the temperature at respective locations within the first reaction zone 101 may be based on the temperatures of the reactants entering that zone and the exotherm of the reactions occurring therein, rather than by heat being added to or removed from the first reaction zone 101. Additionally, the first reaction zone may be at any suitable pressure, e.g., a pressure between about 750 psig and about 1200 psig. The hydrogen may have any suitable partial pressure within the first reaction zone. Illustratively, the first reaction zone may be at a partial pressure of hydrogen between about 750 psia and about 1000 psia. As noted above, conventional hydroprocessing of lipid feedstocks may be performed at partial pressures of hydrogen well in excess of 1000 psia.

Second reaction zone 102 may include a second fixed-bed catalyst configured to convert the saturated, hydrodeoxygenated product from the first reaction zone 101 into an isomerized product including finished transportation fuel. In some examples, under the force of gravity and the pressure of hydrogen at second inlet 112, a mixture of hydrogen and the saturated, hydrodeoxygenated product from the first reaction zone 101 may flow downward into second reaction zone 102. In some examples, the hydrogen is fed into the first reaction zone 101 in excess of what will be consumed within the first and second reaction zones 101 and 102; optionally, unreacted hydrogen optionally may be recycled back to the first reaction zone 101, or to any suitable combination of reaction zones.

The second fixed-bed catalyst in the second reaction zone 102 may be or include a fixed-bed isomerization catalyst configured to isomerize the hydrodeoxygenated product of the first reaction zone 101. The extent of isomerization may be indirectly quantified as measured by the cold flow properties of the product. For instance if making aviation fuel, the key property in this respect is freeze point. If making base oils, pour and cloud points are the important cold flow properties. Deeper isomerization directly correlates with lower freeze, cloud and pour points.

In some examples, the fixed bed isomerization catalyst may include a molecular sieve, a refractory oxide support, and a metal hydrogenation component. The molecular sieve may be shape-selective. In some examples, the shape selective molecular sieve can be selected from intermediate pore size materials such as SAPO-11, SAPO-31, SAPO-41, SM-3, SM-7, ZSM-22, ZSM-23, ZSM-35, ZSM-48, ZSM-57, SSZ-32, SSZ-32X, SSZ-91, offretite, ferrierite, and combinations thereof. For further details regarding SAPO-11, SAPO-31, and SAPO-41, see Mériaudeau et al., "SAPO-11, SAPO-31, and SAPO-41 molecular sieves: Synthesis, characterization, and catalytic properties in n-octane hydroisomerization," Journal of Catalysis 169 (1): 55-66 (1997), the entire contents of which are incorporated by reference herein. For further details regarding other molecular sieves, such as SM-3, SM-7, ZSM-22, ZSM-23, ZSM-35, ZSM-48, ZSM-57, SSZ-32, SSZ-32X, SSZ-91, offretite, and ferrierite, see Baerlocher et al., Atlas of Zeolite Framework Types 6th Edition, Paperback ISBN: 9780444530646, eBook ISBN: 9780080554341 (Aug. 7, 2007), the entire contents of which are incorporated by reference herein.

In some examples, the refractory oxide support may be or include alumina, silica, silica-alumina, titania, or magnesium oxide. In some examples, the metal hydrogenation component may include at least one of: a noble metal, a group VI metal, a group VII metal, and a group VIII metal. The hydrogenation component may be or include, for example, a group VI metal, a group VII metal, or a group VIII metal, or an oxide or sulfide of a group VI metal, a group VII metal, or a group VIII metal. Nonlimiting examples include Mo, W, Co or Ni, or an oxide or sulfide of Mo, W, Co or Ni. Additionally, or alternatively, noble metal(s), such as Pt and/or Pd, may be used as hydrogenation component(s). In some examples, the hydrogenation components include noble metal(s) such as Pt and/or Pd in combination with a group VI metal, a group VII metal, or a group VIII metal, or an oxide or sulfide of a group VI metal, a group VII metal, or a group VIII metal (e.g., Mo, W, Co or Ni or an oxides or sulfide thereof). In some examples, the second fixed-bed catalyst in the second reaction zone 102 may include a noble metal catalyst (e.g., Pt and/or Pd in a concentration of up to about 5% by weight) on zeolite.

As it flows into and then through the second reaction zone 102, the saturated, hydrodeoxygenated product and hydrogen from the first reaction zone 101 may be at any suitable temperature for reaction with the second fixed-bed catalyst in the second reaction zone 102 to isomerize the saturated, hydrodeoxygenated product from the first reaction zone 101. Illustratively, the second reaction zone may be at a temperature between about 550° F. and about 720° F. It will be appreciated that the temperature may vary across the second reaction zone 102. Additionally, the second reaction zone 102 may be adiabatic, such that the temperature at respective locations within the second reaction zone 102 may be based on the temperatures of the reactants entering that zone and the exotherm of the reactions occurring therein, rather than by heat being added to or removed from the second reaction zone. Additionally, the saturated, hydrodeoxygenated product and hydrogen from the first reaction zone 101 may be at any suitable pressure for reaction with the second fixed-bed catalyst in the second reaction zone 102 to isomerize the saturated, hydrodeoxygenated product from the first reaction zone 101. In some examples, in a single reactor the lower pressure limit may be around 600 psig and as high as 3500 psig. If using a more complex multistage configuration the isomerization zone may run at pressures as low as 300 psig.

In the nonlimiting example illustrated in FIG. 1A, first reaction vessel 100 may include outlet 114 which outputs, from the second reaction zone 102, a product including a finished transportation fuel. In some examples, the processing of the renewable fuel intermediate composition using the first reaction zone 101 and the second reaction zone 102 may be sufficient to convert the renewable fuel intermediate composition to a product that includes finished transportation fuel. The finished transportation fuel may include about 10 wt % to about 90 wt % of the product including the finished transportation fuel. Illustratively, the finished transportation fuel may include at least about 40 wt % of the product including the finished transportation fuel, e.g., at least about 50 wt %, or at least about 60 wt. %, or at least about 70 wt %, or at least about 80 wt %, or up to about 90 wt %, of the product including the finished transportation fuel. In some examples, lighter byproducts may be removed, e.g., using distillation. In some examples, the product including the finished transportation fuel (e.g., the product at outlet 114) has a flash point of more than about 38° C. Additionally, or alternatively, in some examples, the product including the finished transportation fuel (e.g., the product at outlet 114) has a freeze point of less than about −40° C. In some examples, the product including the finished transportation fuel is, or includes, finished aviation fuel.

Other configurations suitably may be used. Illustratively, in the nonlimiting example illustrated in FIG. 1B, modified system 10' includes a first reaction vessel 100' and optionally also includes second reaction vessel 120 which may be configured similarly as described with reference to FIG. 1A. First reaction vessel 100' illustrated in FIG. 1B includes modified first reaction zone 101' which includes first region 101-A and second region 101-B, second reaction zone 102, and third reaction zone 103. Inlets and outlets of first reaction vessel 100' may be configured similarly as described with reference to FIG. 1A. In this example, the first, second, and third reaction zones are all commonly located in first reaction vessel 100'. As illustrated, the first, second, and third reaction zones 101', 102, 103 may be vertically arranged, with the second reaction zone above the third reaction zone, and the first reaction zone above the second reaction zone, optionally without any interzone separation. Alternatively, in a manner such as will be described below with reference to FIGS. 3A-3F, the first, second, and third reaction zones 101', 102, 103 may be located in any suitable number of reaction vessels that are directly coupled to one another without any intervening processing, without necessarily being vertically arranged. Additionally, although FIGS. 1B and 3A-3F may suggest that the first, second, and third reaction zones 101', 102, 103are of approximately equal size, this is for illustration purposes only. Regardless of the respective sizes and locations of the first, second, and third reaction zones 101', 102, 103, these reaction zones respectively may include fixed beds of catalysts having configurations and functionalities such described herein, and may be coupled to one another without the need for interzone separation and/or any additional processing in between zones.

In some examples, the first region 101-A of first reaction zone 101' may include a fixed-bed olefin hydrogenation catalyst which is configured to convert the renewable fuel intermediate composition into a saturated product. More specifically, the fixed-bed olefin hydrogenation catalyst in the first reaction zone 101 may be configured to saturate at least 80% of olefins in the renewable fuel intermediate composition. The fixed-bed olefin hydrogenation catalyst may include at least one of: a noble metal, a group VI metal, a group VII metal, and a group VIII metal. In some examples, the fixed-bed olefin hydrogenation catalyst includes a hydrogenation component and, optionally, a binder. The hydrogenation component may be or include, for example, a group VI metal, a group VII metal, or a group VIII metal, or an oxide or sulfide of a group VI metal, a group VII metal, or a group VIII metal. Nonlimiting examples include Mo, W, Co or Ni, or an oxide or sulfide of Mo, W, Co or Ni. Additionally, or alternatively, noble metal(s), such as Pt and/or Pd, may be used as hydrogenation component(s). In some examples, the hydrogenation components include noble metal(s) such as Pt and/or Pd in combination with a group VI metal, a group VII metal, or a group VIII metal, or an oxide or sulfide of a group VI metal, a group VII metal, or a group VIII metal (e.g., Mo, W, Co or Ni or an oxides or sulfide thereof). In some examples, the binder may be or include a refractory oxide support, such as alumina, silica, silica-alumina, titania, or magnesium oxide. In one nonlimiting example, the fixed-bed olefin hydrogenation catalyst in the first region 101-A may include a noble metal catalyst (e.g., Pt and/or Pd in a concentration of up to about 5% by weight) on an oxide substrate (e.g., alumina).

Second region 101-B of first reaction zone 101' may include a fixed-bed hydrodeoxygenation catalyst configured to hydrodeoxygenate the saturated product from the first region 101-A. In some examples, under the force of gravity and the pressure of hydrogen at second inlet 112, a mixture of hydrogen and the saturated product from the first region 101-A may flow downward into second region 101-B. Nonlimiting options regarding hydrogen supply to the various reaction zones are described with reference to FIG. 1A. The fixed-bed hydrodeoxygenation catalyst in the second reaction zone 102 may be configured to remove at least 70 wt % of oxygen from the saturated product of the first reaction zone 101. The fixed-bed hydrodeoxygenation catalyst may include at least one of: a noble metal, a group VI metal, a group VII metal, and a group VIII metal. In some examples, the fixed-bed hydrodeoxygenation catalyst includes a hydrogenation component and, optionally, a binder. The hydrogenation component may be or include, for example, a group VI metal, a group VII metal, or a group VIII metal, or an oxide or sulfide of a group VI metal, a group VII metal, or a group VIII metal. Nonlimiting examples include Mo, W, Co or Ni, or an oxide or sulfide of Mo, W, Co or Ni. Additionally, or alternatively, noble metal(s), such as Pt and/or Pd, may be used as hydrogenation component(s). In some examples, the hydrogenation components include noble metal(s) such as Pt and/or Pd in combination with a group VI metal, a group VII metal, or a group VIII metal, or an oxide or sulfide of a group VI metal, a group VII metal, or a group VIII metal (e.g., Mo, W, Co or Ni or an oxides or sulfide thereof). In some examples, the binder may be or include a refractory oxide support, such as alumina, silica, silica-alumina, titania, or magnesium oxide. In one nonlimiting example, the fixed-bed hydrodeoxygenation catalyst in the second region 101-B may include a noble metal catalyst (e.g., Pt and/or Pd in a concentration of up to about 5% by weight) on an oxide substrate (e.g., alumina).

In this regard, note that although the fixed-bed hydrodeoxygenation catalyst in the second region 101-B may have a similar composition in certain examples as the fixed-bed olefin hydrogenation catalyst of the first region 101-A, the catalyst may perform different reactions in the second region 101-B than in the first region 101-A. For example, the reaction conditions in the first region 101-A may be different than in the second region 101-B, and the mixture of chemicals flowing into the first region 101-A are at least partially different than those which flow into the second region 101-B. Illustratively, olefin saturation is the easiest reaction and will take place at the lowest temperatures. If the temperature in the first reaction zone is sufficiently low, the conversion will not proceed until the temperature is higher, as in a different reaction zone. But if the temperature in the first reaction zone is high enough, then double bond saturation and hydrodeoxygenation can all proceed to completion in the first reaction zone.

As it flows into and then through the second region 101-A, the saturated product and hydrogen from the first region 101-B may be at any suitable temperature for reaction with the fixed-bed hydrodeoxygenation catalyst in the second region 101-B to hydrodeoxygenate the saturated product from the first region 101-A. Illustratively, the second region 101-B may be at a temperature between about 200° F. and about 700° F. It will be appreciated that the temperature may vary across the second region 101-B. Additionally, the second region 101-B may be adiabatic, such that the temperature at respective locations within the second region may be based on the temperatures of the reactants entering that zone and the exotherm of the reactions occurring therein, rather than by heat being added to or removed from the second region. Additionally, the saturated product and hydrogen from the first region 101-A may be at any suitable pressure for reaction with the fixed-bed hydrodeoxygenation catalyst in the second region 101-B to hydrodeoxygenate the saturated product from the first region 101-A. Illustratively, the second region 101-B may be at a pressure between about 600 psig and about 3500 psig. Additionally, or alternatively, the second region 101-B may be at a partial pressure of hydrogen between about 600 psia and about 3500 psia.

Second reaction zone 102 illustrated in FIG. 1B may be configured similarly as described with reference to FIG. 1A, e.g., may be configured to convert the saturated, hydrodeoxygenated product from the first reaction zone 101 into an isomerized product that includes finished transportation fuel. In some examples, under the force of gravity and the pressure of hydrogen at second inlet 112, a mixture of hydrogen and the saturated, hydrodeoxygenated product from the second region 101-B may flow downward into second reaction zone 102. Nonlimiting examples of the second fixed-bed catalyst in the second reaction zone 102 are described above with reference to FIG. 1A.

In some examples, system 10 described with reference to FIG. 1A or system 10' described with reference to FIG. 1B optionally further includes a third reaction zone which is configured to perform post-treatment of the product of the second reaction zone 102. Illustratively, system 10' optionally includes third reaction zone 103 which includes a fixed-bed post-treatment catalyst configured to post-process the product including the finished transportation fuel which is generated using second reaction zone 102. In some examples, under the force of gravity and the pressure of hydrogen at second inlet 112, a mixture of hydrogen and the product from second reaction zone 102 may flow downward into third reaction zone 103. The fixed-bed post-treatment catalyst in the third reaction zone 103 may be configured to post-process the product of the second reaction zone 102. In some examples, post-processing may be used to ensure no aromatics remained in the final product.

The fixed-bed hydrodeoxygenation catalyst may include at least one of: a noble metal, a group VI metal, a group VII metal, and a group VIII metal. In some examples, the post-processing catalyst includes a hydrogenation component and, optionally, a binder. The hydrogenation component may be or include, for example, a group VI metal, a group VII metal, or a group VIII metal, or an oxide or sulfide of a group VI metal, a group VII metal, or a group VIII metal. Nonlimiting examples include Mo, W, Co or Ni, or an oxide or sulfide of Mo, W, Co or Ni. Additionally, or alternatively, noble metal(s), such as Pt and/or Pd, may be used as hydrogenation component(s). In some examples, the hydrogenation components include noble metal(s) such as Pt and/or Pd in combination with a group VI metal, a group VII metal, or a group VIII metal, or an oxide or sulfide of a group VI metal, a group VII metal, or a group VIII metal (e.g., Mo, W, Co or Ni or an oxides or sulfide thereof). In some examples, the binder may be or include a refractory oxide support, such as alumina, silica, silica-alumina, titania, or magnesium oxide. In one nonlimiting example, the post-processing catalyst in the third reaction zone 103 may include a noble metal catalyst (e.g., Pt and/or Pd in a concentration of up to about 5% by weight) on an oxide substrate (e.g., alumina).

In this regard, note that although the post-processing in the second region 101-B may have a similar composition in certain examples as the fixed-bed olefin hydrogenation catalyst(s) of the first reaction zone 101 or 101' (e.g., of first region 101-A and/or fixed-bed hydrodeoxygenation catalyst of the second region 101-B), the catalyst may perform different reactions in the third reaction zone 103 than in the first reaction zone 101 or 101'. For example, the reaction conditions in the first reaction zone 101 or 101' may be different than in the third reaction zone 103 and the mixture of chemicals flowing into the first reaction zone 101 or 101' are at least partially different than those which flow into the third reaction zone 103.

As it flows into and then through the third reaction zone 103, the product and hydrogen from the second reaction zone 102 may be at any suitable temperature for reaction with the fixed-bed post-processing catalyst in the third reaction zone 103. Illustratively, the third reaction zone 104 may be at a temperature between about 350° F. and about 500° F. It will be appreciated that the temperature may vary across the third reaction zone 103. Additionally, the third reaction zone 103 may be adiabatic, such that the temperature at respective locations within the third reaction zone 103 may be based on the temperatures of the reactants entering that zone and the exotherm of the reactions occurring therein, rather than by heat being added to or removed from the third reaction zone. Additionally, the product and hydrogen from the second reaction zone 102 may be at any suitable pressure for reaction with the fixed-bed post-treatment catalyst in the third reaction zone 103 to post-process the product from the second reaction zone 102. Illustratively, the third reaction zone may be at a pressure between about 600 psig and about 3500 psig. Additionally, or alternatively, the third reaction zone may be at a partial pressure of hydrogen between about 600 psia and about 3500 psia.

Although not specifically illustrated in FIG. 1A, it will be appreciated that system 10 optionally may include a third reaction zone such as described with reference to FIG. 1B.

As illustrated in FIG. 1B, first reaction vessel 100' may include outlet 114 which outputs, a product including finished transportation fuel. In some examples, the processing of the renewable fuel intermediate composition using the first reaction zone 101', the second reaction zone 102, and the third reaction zone 103 may be sufficient to convert the renewable fuel intermediate composition to a product that includes finished transportation fuel. In a manner similar to that described with reference to FIG. 1B, the finished transportation fuel may include about 10 wt % to about 90 wt % of the product including the finished transportation fuel. The finished transportation fuel may include at least about 40 wt % of the product including the finished transportation fuel, e.g., at least about 50 wt %, or at least about 60 wt. %, or at least about 70 wt %, or at least about 80 wt %, or up to about 90 wt % of the product including the finished transportation fuel. In some examples, lighter byproducts may be removed, e.g., using distillation. In some examples, the product including the finished transportation fuel (e.g., the product at outlet 114) has a flash point of more than about 38° C. Additionally, or alternatively, in some examples, the product including the finished transportation fuel (e.g., the product at outlet 114) has a freeze point of less than about −40° C.

In some examples, the finished transportation fuel may be separated from the product in any suitable manner and then used as transportation fuel without further processing. Illustratively, system 10 described with reference to FIG. 1A or system 10' described with reference to FIG. 1B may include distillation column 130 configured to distill the product including the finished transportation fuel to obtain a fraction that consists essentially of the finished transportation fuel. A byproduct may be separately output from distillation column 130, as illustrated in FIGS. 1A-1B. Alternatively, the product may be collected from outlet 114 of first reaction vessel 100 or 100' and transported to another site at which the finished transportation fuel is separated from the product, e.g., using distillation. In some examples, the finished transportation fuel is, includes, or consists essentially of finished aviation fuel (e.g., following separation from the product) that has a flash point of more than about 38° C. Additionally, in some examples, the finished aviation fuel may have a freeze point of less than about −40° C. (e.g., meets jet A standards). Additionally, in some examples, the finished aviation fuel has a freeze point of less than about −47° C. (e.g., meets jet A-1 standards).

It will be appreciated that the first, second, and (if included) third reaction zones 101 or 101', 102, 103 respectively may have any suitable reaction conditions, and that the reaction conditions for one of such zones may be the same as the reaction conditions in another one or more of such zones, or may be different than the reaction conditions in another one or more of such zones. Illustratively, in some examples the first, second, and (if included) third reaction zones may be all at substantially the same pressure as one another, while in other examples one or more of the first, second, and (if included) third reaction zones may be at different pressures than as one another. As another example, at least two of the first, second, and (if included) third reaction zones may be at different temperatures than one another, while in other examples all of the first, second, and (if included) third reaction zones may be at different temperatures than one another. As yet another example, liquid hourly space rates in at least two of the first, second, and (if included) third reaction zones may be different than one another, while in other examples liquid hourly space rates in all of the first, second, and (if included) third reaction zones may be different than one another. In some examples, depending on factors such as reaction temperature, feed oxygen content, intended product type(s) and product specs, the liquid hourly space rates in the first, second, and (if included) third reaction zones each may be in the range of about 0.1-15 hr$^{-1}$, and may be different than one another or may be the same as one another.

Additionally, in some examples, the first, second, and (if included) third reaction zones are adiabatic. As such, the heat from the reactants entering a given zone and/or the exotherm from the reactions occurring within that zone, may drive the reactions in that zone, and optionally in one or more subsequent zones as well. For example, a reaction exotherm from the first reaction zone 101 may provide sufficient heat to the second reaction zone 102 to generate the product. Illustratively, a temperature of the renewable fuel intermediate composition entering the first reaction zone 101 may be about 50-600° F. lower than a temperature of the saturated, hydrodeoxygenated product entering the second reaction zone 102. In comparison, as noted further above, in conventional hydroprocessing of lipid feedstocks, the double bond saturation of the lipid feedstock may be so exothermic that its rate must be limited using a recycle stream. In the present systems and methods, the heat from olefin saturation in first reaction zone 101 may be used to promote subsequent reactions (e.g., isomerization) without the need to limit the rate of reaction (e.g., by using a conventional recycle stream).

While the first, second, and (if included) third reaction zones 101, 102, and 103 are commonly located within a single reaction vessel 100 in the nonlimiting example of FIG. 1A, other configurations suitably may be used. For example, FIGS. 2A-2F schematically illustrate alternative configurations of the system of FIG. 1A. In the configuration illustrated in FIG. 2A, the first reaction zone ("Zone 1") is located in a first reaction vessel 201, the second reaction zone ("Zone 2") is located in a second reaction vessel 202, and the third reaction zone is not included. In the configuration illustrated in FIG. 2B, the first and second reaction zones are commonly located in a first reaction vessel 201, while the third reaction zone is not included. In the configuration illustrated in FIG. 2C, the first reaction zone is located in a first reaction vessel 201, the second reaction zone is located in a second reaction vessel 202, and the third reaction zone is included and is located in a third reaction vessel 203. In the configuration illustrated in FIG. 2D, the first and second reaction zones are commonly located in a first reaction vessel 201, and the third reaction zone is located in a third reaction vessel 202. In the configuration illustrated in FIG. 2E, the first reaction zone is located in a first reaction vessel 201, and the second and third reaction zones are located in a second reaction vessel. In the configuration illustrated in FIG. 2F, the first, second, and third reaction zones are located in a first reaction vessel 201.

Still other configurations suitably may be used. FIGS. 3A-3F schematically illustrate alternative configurations of the system of FIG. 1B. While the third reaction zone is illustrated in each of FIGS. 3A-3F, this zone is optional and may be omitted. In the configuration illustrated in FIG. 3A, the first and second regions of the first reaction zone ("Zone 1A" and "Zone 1B") are commonly located in a first reaction vessel 301, the second reaction zone ("Zone 2") is located in a second reaction vessel 302, and the optional third reaction zone ("Zone 3") is located in a third reaction vessel 303. In the configuration illustrated in FIG. 3B, the first region of the first reaction zone is located in a first reaction vessel 301, the second region of the first reaction zone and the second reaction zone are commonly located in a second reaction vessel 302, and the optional third reaction zone is located in a third reaction vessel 303. In the configuration illustrated in FIG. 3C, the first region of the first reaction zone is located in a first reaction vessel 301, the second region of the first reaction zone is located in a second reaction vessel 302, and the second reaction zone and optional third reaction zone are commonly located in a third reaction vessel 303. In the configuration illustrated in FIG. 3D, the first and second regions of the first reaction zone are commonly located in a first reaction vessel 301, while the second reaction zone and optional third reaction zone are commonly located in a second reaction vessel 302. In the configuration illustrated in FIG. 3E, the first region of the first reaction zone is located in a first reaction vessel 301, and the second region of the first reaction zone, the second reaction zone, and optional third reaction zone, are located in a second reaction vessel 302. In the configuration illustrated in FIG. 3F, the first and second regions of the first reaction zone, and the second reaction zone, are located in a first reaction vessel 301, while the optional third reaction zone is located in a second reaction vessel 302.

Note that the designation of a particular vessel herein as being "first," "second," or "third" should not be interpreted as connoting any particular order of operations or arrangement of the vessels. In comparison, however, the designation of a reaction zone as being "first," "second," or "third," is intended to indicate the order in which that reaction zone is arranged and used. In examples such as illustrated in FIGS. 2A-2F and 3A-3F, any suitable number of reaction zones may be located in different reaction vessels than one another and may be directly coupled to one another via piping (bold downward-facing arrows), without any intervening processing. Note that although FIGS. 2A-2F and 3A-3F may suggest that the vessels in which the zones are located are vertically arranged, the vessels may have any suitable spatial relationship to one another.

Figure 2A:
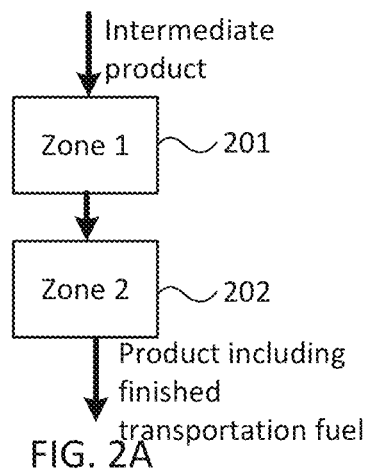
FIGS. 2A-2F schematically illustrate alternative configurations of the system of FIG. 1A.
Figure 2B:
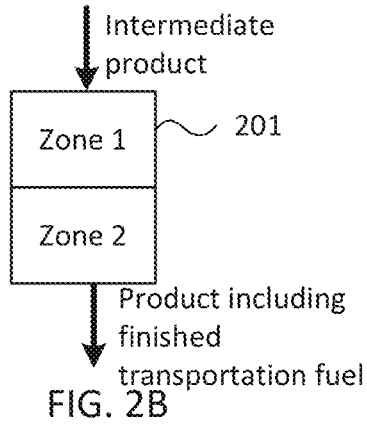
Figure 2C:
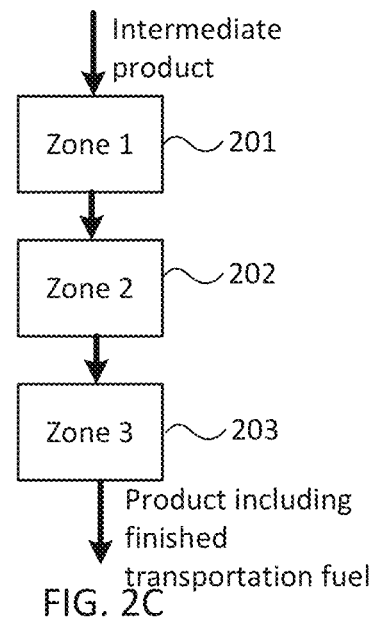
Figure 2D:
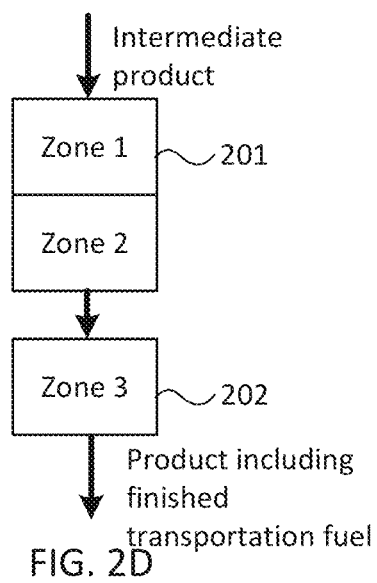
Figure 2E:
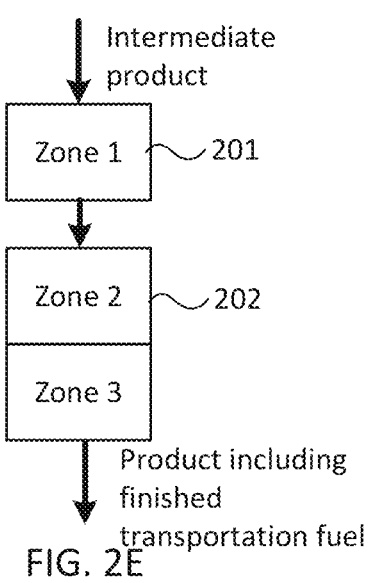
Figure 2F:
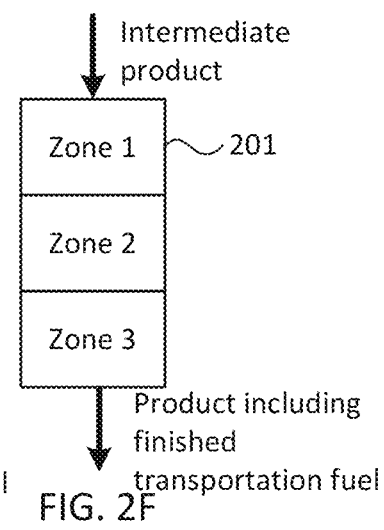
Figure 3A:
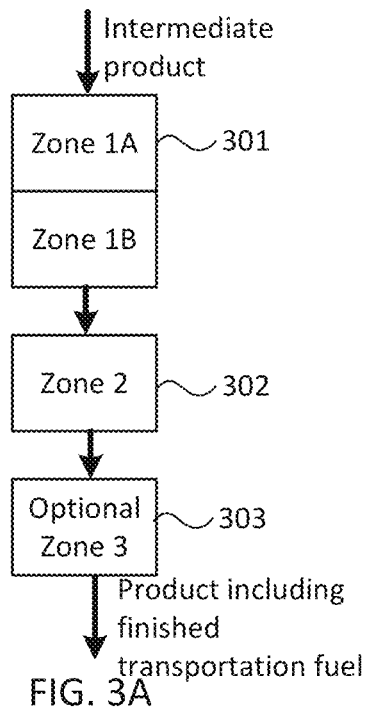
FIGS. 3A-3F schematically illustrate alternative configurations of the system of FIG. 1B.
Figure 3B:
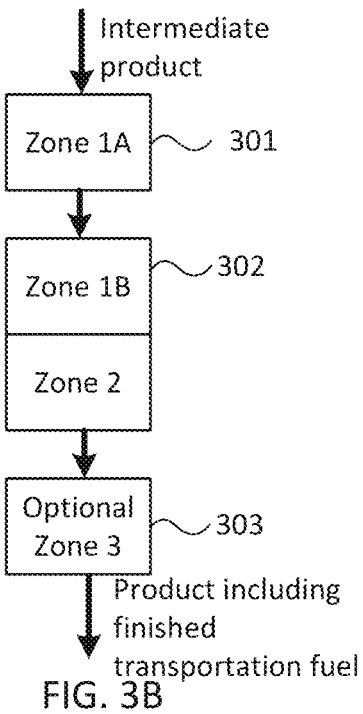
Figure 3C:
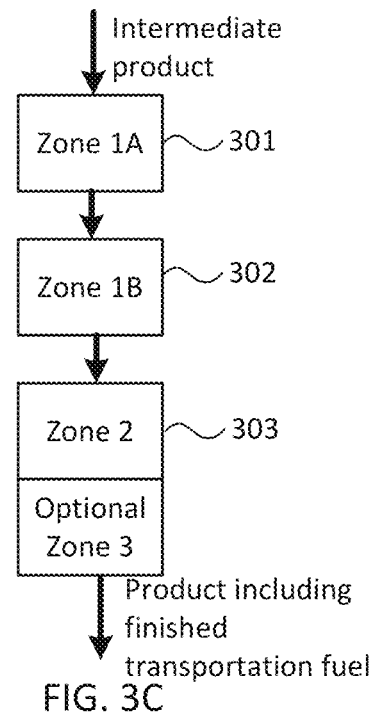
Figure 3D:
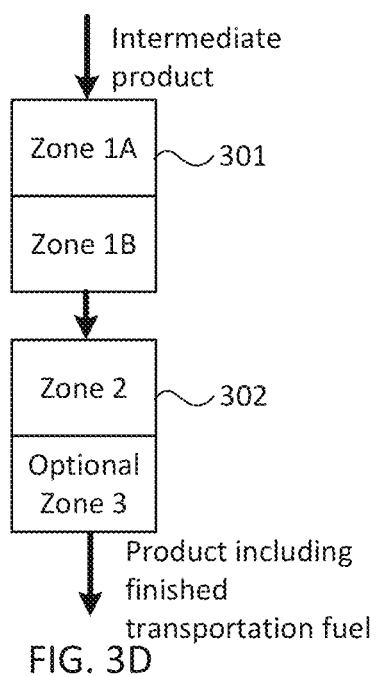

While FIGS. 1A-1B, 2A-2F, and 3A-3F illustrate example configurations, and operations, that may be used to generate finished transportation fuel using a renewable fuel intermediate composition, other configurations, and other operations, suitably may be used. For example, FIG. 4 illustrates an example flow of operations in a method 400 for generating finished transportation fuel using a renewable fuel intermediate composition. Method 400 illustrated in FIG. 4 may include flowing a renewable fuel intermediate composition over a first fixed-bed catalyst in a first reaction zone to generate a saturated, hydrodeoxygenated product (operation 410). In some examples, the first fixed-bed is located in its own reaction vessel (e.g., such as illustrated in FIGS. 2A, 2C, 2E, 3A, or 3D), while in other examples the first fixed-bed catalyst is commonly located in the same reaction vessel as another reaction zone used in method 400 (e.g., such as illustrated in FIGS. 1A, 1B, 2B, 2D, 2F, or 3F). Further details of example fixed-bed first catalysts, and example reactants, reaction conditions, and products, are described with reference to FIGS. 1A-1B.

Method 400 illustrated in FIG. 4 also may include flowing the saturated, hydrodeoxygenated product of operation 410 over a second fixed-bed catalyst in a second reaction zone to generate a product including finished transportation fuel (operation 420). In some examples, the second fixed-bed catalyst is located in its own reaction vessel (e.g., such as illustrated in FIGS. 2A, 2C, or 3A), while in other examples the second fixed-bed catalyst is commonly located in the same reaction vessel as another reaction zone used in method 400 (e.g., such as illustrated in FIGS. 1A-1B, 2B, 2D, 2E, 2F, 3B, 3C, 3D, 3E, or 3F). Further details of an example second fixed-bed catalyst, and example reactants, reaction conditions, and products, are described with reference to FIGS. 1A-1B.

Optionally, system 10 or 10' may further include a subsystem configured to generate the renewable fuel intermediate composition, and/or method 400 may include generating the renewable fuel intermediate composition. Illustratively, system 10 or 10' may include subsystem 120 ("catalytic conversion"). Subsystem 120 may include a second reaction vessel including a metal oxide catalyst on an oxide support and configured to catalytically convert the lipid feedstock to an intermediate mixture. Subsystem 120 optionally also may include a distillation column configured to distill the intermediate mixture to obtain a fraction that primarily includes the renewable fuel intermediate composition. In some examples, the renewable fuel intermediate composition may consist essentially of a distillation fraction having a boiling point ranging from about 200° F. to about 700° F., e.g., about 300° F. to about 680° F.

Figure 5:
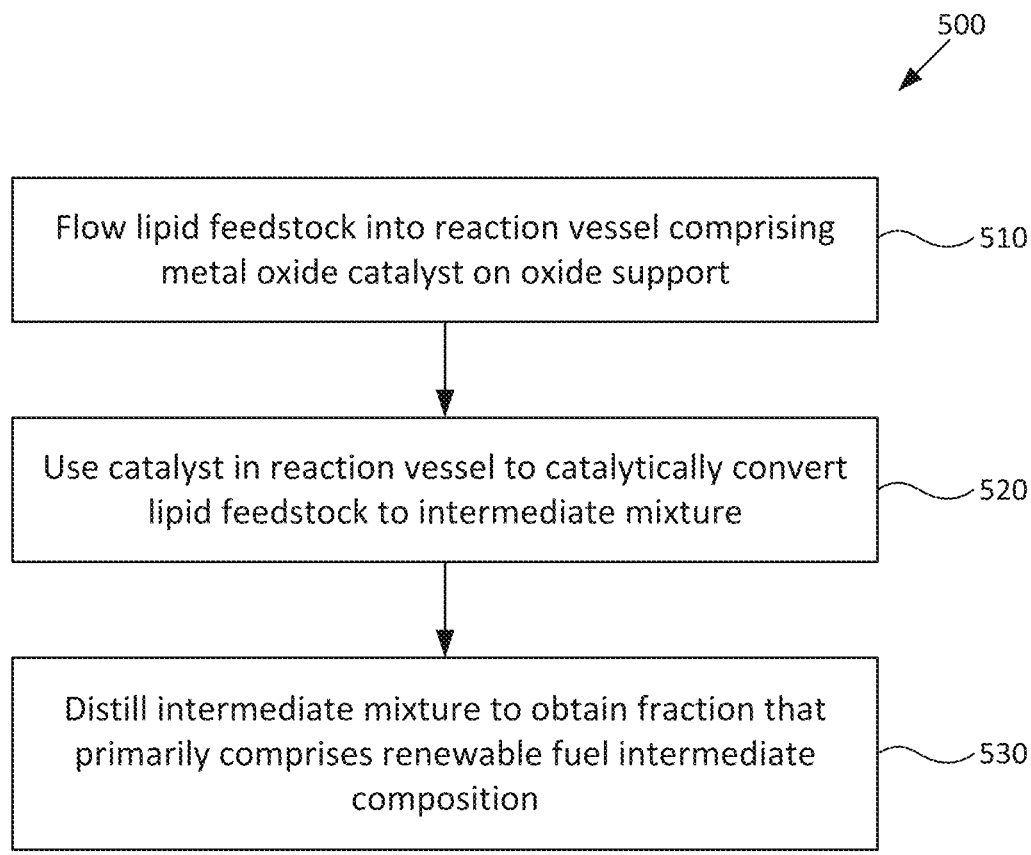
FIG. 5 schematically illustrates an example flow of operations in a method for generating a renewable fuel intermediate composition.
Figure 6:
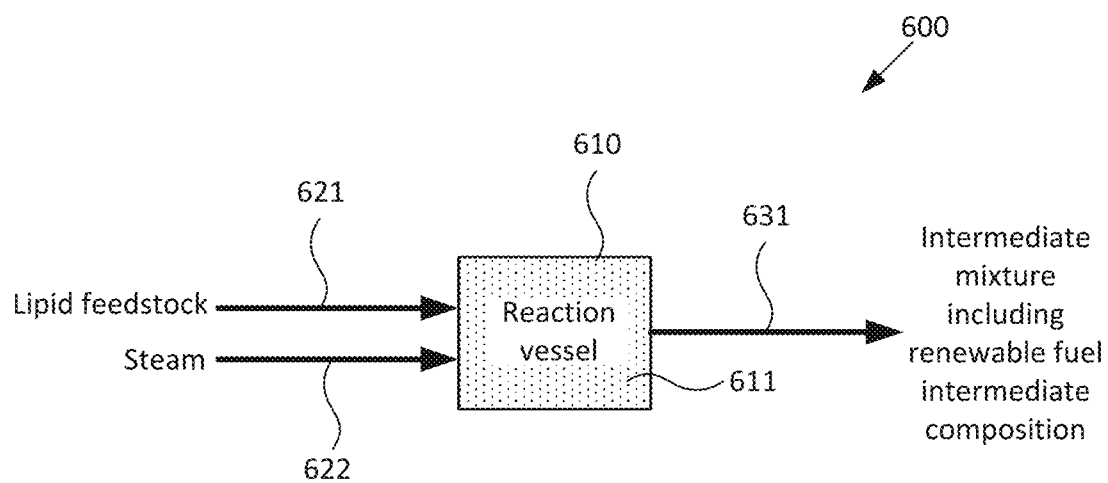
FIG. 6 schematically illustrates an example system for generating a renewable fuel intermediate composition.

Further details regarding systems and methods for generating a renewable fuel intermediate composition now will be provided with reference to FIGS. 5 and 6. It will be appreciated that alternative systems and methods may be used.

FIG. 5 illustrates an example flow of operations in a method 500 for generating a renewable fuel intermediate composition lipid feedstock. Method 500 illustrated in FIG. 5 may include flowing the lipid feedstock into a reaction vessel including a metal oxide catalyst on an oxide support (operation 510). Nonlimiting examples of lipid feedstocks are provided further above. The lipid feedstock may be flowed over any suitable metal oxide catalyst. In some examples, the metal oxide catalyst includes at least one metal selected from the group consisting of Na, K, Mg, Ca, Sr, and a rare earth metal. Illustratively, the metal oxide catalyst may include at least one metal selected from the group consisting of Na, K, Ca, and Mg. In some examples, the metal of the metal oxide catalyst may be an alkali metal such as lithium, sodium, or potassium. In some examples, the metal of the metal oxide catalyst may be an alkaline earth metal such as magnesium, strontium, or calcium. In one nonlimiting example, the metal oxide catalyst may include calcium oxide, and in some examples may consist essentially of calcium oxide, or may consist of calcium oxide. The calcium within the calcium oxide catalyst may be in oxidation state 2 (as in CaO), but it may be in any suitable chemical form and is not limited to exclusively CaO. Additionally, the chemistry of the calcium oxide catalyst may change over time and/or with exposure to the lipid feedstock. For example, the calcium oxide catalyst initially may be in the form of CaO, CaO(OH), or Ca(OH)$_2$, or a mixture thereof. In operation, the calcium may be in the form of a mixture of any such compounds and/or in the form of carbonate or carboxylate. Additionally, or alternatively, the calcium may become partially embedded in the oxide support as aluminate, e.g., oxy-aluminate and/or hydroxy-aluminates. The metal oxide catalyst may be supported on any suitable oxide support, such as alumina. In some examples, the lipid feedstock is flowed over substantially no other solid-state materials besides the metal oxide catalyst (e.g., calcium oxide catalyst or other alkaline earth metal oxide catalyst) on the oxide support (e.g., alumina).

The lipid feedstock may be flowed over the metal oxide catalyst in any suitable reaction vessel(s). Although the oxide support may not specifically be mentioned in all cases, it will be understood that the metal oxide catalyst is supported by the oxide support. FIG. 6 schematically illustrates an example system 600 for generating a renewable fuel intermediate composition using a lipid feedstock. In the nonlimiting example illustrated in FIG. 6, system 600 may include reaction vessel 610 in which metal oxide catalyst 611 is disposed. Piping 621 may be coupled to a first inlet of reaction vessel 610 such that lipid feedstock may be flowed into reaction vessel 610 and across metal oxide catalyst 611. Piping 622 may be coupled to a second inlet of reaction vessel 610 such that steam may be flowed into reaction vessel 610 and across metal oxide catalyst 611 together with the lipid feedstock. In some examples, the metal oxide catalyst 611 is in a fixed bed over which the lipid feedstock is flowed, the metal oxide catalyst and the feedstock may be brought into contact with one another in any suitable manner. In other examples, the metal oxide catalyst 611 instead may be in a fluid bed, or in a moving bed. It will be appreciated that the metal oxide catalyst on the oxide support may have any suitable configuration for use in the particular reaction vessel 610. In some examples, the metal oxide catalyst on the oxide support includes particles with sizes in the range of about 0.01 mm to about 5 mm. In nonlimiting examples in which a fixed bed reaction is used, the metal oxide catalyst on the oxide support may include (or in some cases may consist essentially of) particles with sizes in the range of about 1 mm to about 5 mm. In nonlimiting examples in which a fluid bed reaction is used, the metal oxide catalyst on the oxide support may include (or in some cases may consist essentially of) particles with sizes in the range of about 0.05 mm to about 0.2 mm. In nonlimiting examples in which a moving bed reaction is used, the metal oxide catalyst on the oxide support may include (or in some cases may consist essentially of) particles with sizes in the range of about 0.05 mm to about 0.2 mm.

The metal oxide catalyst on the oxide support additionally, or alternatively, may have any suitable combination of properties, e.g., bulk density, particle density, packed density, pore volume, large pore content, average pore diameter, and/or surface area. Illustratively, the metal oxide catalyst may have one or more of the following properties, or any suitable combination of two or more of the following properties: a bulk density in the range of about 0.78 kg/l to about 0.86 kg/l; a particle density in the range of about 1.2 kg/l to about 1.4 kg/l; a packed density in the range of about 0.8 g/cc to about 1.0 g/cc; a pore volume in the range of about 0.42 to about 0.48 cc/g; a large pore content (pores>1000 Å) of about 0.30 cc/g to about 0.38 cc/g; an average pore diameter (D50) of about 100 Å to about 200 Å; and/or a surface area of about 50 m$^2$/g to about 150 m$^2$/g. Additionally, or alternatively, the metal oxide catalyst may have one or more of the following properties, or any suitable combination of two or more of the following properties: a bulk density in the range of about 0.80 kg/l to about 0.84 kg/l; a particle density in the range of about 1.1 kg/l to about 1.3 kg/l; a packed density in the range of about 0.85 g/cc to about 0.95 g/cc; a pore volume in the range of about 0.44 to about 0.46 cc/g; a large pore content (pores>1000 Å) of about 0.33 cc/g to about 0.36 cc/g; an average pore diameter (D50) of about 130 Å to about 160 Å; and/or a surface area of about 80 m$^2$/g to about 120 m$^2$/g.

Referring again to FIG. 5, method 500 further may include using the metal oxide catalyst in the reaction vessel to catalytically convert the lipid feedstock to an intermediate mixture which includes the renewable fuel intermediate composition (operation 520). The lipid feedstock may be reacted with the metal oxide catalyst under any suitable combination of reaction conditions to generate the intermediate mixture. In various examples, the catalytic conversion may be performed at a temperature of about 400° C. to about 700° C., illustratively about 425° C. to about 600° C., e.g., about 450° C. to about 550° C., e.g., about 475° C. to about 500° C. Additionally, in some examples, the catalytic conversion may be performed at a pressure in the range of about 0.01 MPa to about 10 MPa, illustratively about 0.1 to about 5 MPa, e.g., about 0.1 to about 1 Mpa. Additionally, in some examples, the catalytic conversion may be performed at a liquid hourly space velocity (LHSV) in the range of about 0.1 h$^{-1}$ to about 10 h$^{-1}$, illustratively about 0.2 h$^{-1}$ to about 5 h$^{-1}$, or about 0.3 h$^{-1}$ to about 3 h$^{-1}$, or about 0.5 h$^{-1}$ to about 1.5 h$^{-1}$. LHSV may be calculated as the volume of lipid feedstock per volume of catalyst per hour.

In some examples, the catalytic conversion of the lipid feedstock to the intermediate composition uses steam as an additional input to the reaction vessel, e.g., via piping 622 coupled to a second inlet of reaction vessel 610 illustrated in FIG. 6. The steam may inhibit cracking and coke formation. In some examples, the steam is provided in an amount of about 0 wt % to about 50 wt %, and its use is optional. Some examples use substantially only steam and the lipid feedstock as inputs to the reaction vessel 610 for reactions which are catalyzed by the metal oxide catalyst on the oxide support. That is, hydrogen may not be separately input to reaction vessel 610. Additionally, the steam may not be a reactant in the reactions between the lipid feedstock and the metal oxide catalyst on the oxide support, e.g., may not be a source of hydrogen for such reactions. The reaction(s) performed using the metal oxide catalyst may reduce the amount of oxygen in the lipid feedstock. For example, the intermediate composition may include less than about 70 wt % of an amount of oxygen in the lipid feedstock. Additionally, the reaction(s) performed using the metal oxide catalyst may modify the location(s) of oxygen within the molecules being reacted. For example, at least about 70 wt %, or at least about 80 wt % of the oxygen in the liquid portion of the intermediate composition may be within ketone groups. In comparison, in some examples, the lipid feedstock substantially may not include any ketone groups.

As provided herein, in addition to converting the lipid feedstock to the intermediate mixture, the metal oxide catalyst on the oxide support also may be used to remove impurities from the renewable feedstock, for example without the use of a separate catalyst. Indeed, the catalytic conversion described with reference to FIGS. 5 and 6 may remove multiple contaminants, thus rendering the renewable fuel intermediate composition safe to bring into contact with subsequent catalysts for use in generating a renewable transportation fuel (e.g., in a manner such as described with reference to FIGS. 1A-1B, 2A-2F, 3A-3F, and 4). In some examples, the intermediate composition lacks a detectable amount of metal. In some examples, the intermediate composition lacks a detectable amount of phosphorous. In some examples, intermediate composition lacks a detectable amount of chlorine. The amount (if any) of metal, phosphorous, and/or certain other contaminants may be measured in any suitable manner, such as inductively coupled plasma-mass spectrometry (ICP). In some examples, an organic chloride contaminant level can be determined by X-ray Fluorescence Spectroscopy, e.g., ASTM D7536-09, Standard Test Method for Chlorine in Aromatics by Monochromatic Wavelength Dispersive X-ray Fluorescence Spectrometry. In other examples, chlorine content may be determined using combustion ion chromatography (CIC), a technique in which a sample is burned in an oxygen-containing gas flow, the gas generated (including halogen ions) is absorbed by a solution, and then the halogen content of the solution is quantitatively analyzed using ion chromatography. Additionally, or alternatively, in some examples, chlorine content may be determined using X-ray fluorescence to determine chloride content with a detection limit of about 1 ppm.

When it is described herein that a composition "lacks a detectable amount" of an element, it means that the amount of that element in the composition is approximately at or below than the measurement threshold of the respective instrument being used to measure that element. Of course, different instruments may have different measurement thresholds than one another. In some examples, the instrument has a measurement threshold of about 5 ppm, and the intermediate composition has a concentration of less than about 5 ppm of metal, phosphorous, and/or chlorine. In some examples, the instrument has a measurement threshold of about 1 ppm, and the intermediate composition has a concentration of less than about 1 ppm of metal, phosphorous, and/or chlorine. In other examples, the instrument has a measurement threshold of about 0.5 ppm, and the intermediate composition has a concentration of less than about 0.5 ppm of metal, phosphorous, and/or chlorine. In still other examples, the instrument has a measurement threshold of about 0.1 ppm, and the intermediate composition has a concentration of less than about 0.1 ppm of metal, phosphorous, and/or chlorine.

Illustratively, in the nonlimiting example illustrated in FIG. 6, system 600 may include piping 631 coupled to an outlet of reaction vessel 610 such that the intermediate mixture including the renewable fuel intermediate composition, generated by reaction of the lipid feedstock with the metal oxide catalyst 611 within vessel 610, may be flowed out of reaction vessel 610. The metal oxide catalyst 611 may be regenerated at any suitable time, and in any suitable manner. For example, in nonlimiting configurations in which the metal oxide catalyst is in a fixed bed, the lipid feedstock inlet may be turned off, and air may be provided to the reaction vessel 610 to stimulate a combustion process therein which burns coke from the metal oxide catalyst 611.

Referring again to FIG. 5, method 500 may include distilling the intermediate mixture to obtain a fraction that primarily includes the renewable fuel intermediate composition (operation 530). In some examples, the renewable fuel intermediate composition includes a mixture of organic compounds primarily having a boiling point above about 150° C. (e.g., between about 150° C. and about 360° C.). The renewable fuel intermediate composition may be further processed in any suitable manner to form a final product (e.g., renewable transportation fuel), e.g., in a manner such as described with reference to FIGS. 1A-1B, 2A-2F, 3A-3F, and 4.

In addition to the above-noted deficiencies of directly hydroprocessing lipid feedstocks, previously known approaches to hydrotreating lipids typically produce a majority of hydrocarbons in the diesel fuel range with very little in the jet fuel range. However, it has been discovered that the systems and methods described with reference to FIGS. 5 and 6 may be used to produce a renewable fuel intermediate composition that is surprisingly lighter and richer in components in the jet fuel range. Without being bound by a particular theory, it is believed that in the present systems and methods, heavier components of the intermediate composition that have a boiling point that is too high for evaporation under the conditions in the reaction vessel tend to remain in the liquid phase in the reaction vessel until they convert further into lighter products that evaporate in the reaction vessel and are carried out of the reaction vessel with the treated stream. It is further understood that the systems and methods described with reference to FIGS. 5 and 6 restructure the carbon chains in the fatty acids of the lipids. In some examples, the intermediate composition is or includes a mixture of essentially non-acidic hydrocarbons and oxygenates, primarily ketones, with chain lengths varying from significantly shorter than the original fatty acid chain length to considerably longer than the original fatty acid chain length. This phenomenon yields a renewable fuel intermediate composition that is particularly useful for producing products in the aviation fuel range, e.g., using systems and operations such as described with reference to FIGS. 1A-1B, 2A-2F, 3A-3F, and 4.

In some examples, the renewable fuel intermediate composition exiting reaction vessel 610 may be separated into the following components: 1) renewable fuel gas including (and, in some examples, consisting essentially of) C1 and C2 hydrocarbons with a boiling point range of about 0° C. to about 20° C., 2) a renewable liquefied petroleum gas (LPG) including (and, in some examples, consisting essentially of) C3 and C4 hydrocarbons with a boiling point range of about 20° C. to about 150° C., 3) a renewable intermediate transportation fuel including (and, in some examples, consisting essentially of) hydrocarbons in the range of C5 to C20 with a boiling point range of about 150° C. to about 360° C., and 4) a heavy ends product including (and, in some examples, consisting essentially of) hydrocarbons in the range of C21 to C35 with a boiling point range of about 360° C. to about 490° C. Such separation may be performed, for example, using distillation in a manner such as known in the art.

In some examples, such separation may be used to obtain a liquid portion of the renewable fuel intermediate composition having the following characteristics:

(1) naphtha (boiling point of about 20° C. to about 100-150° C.) of greater than 10 wt % and less than about 30 wt % in the intermediate composition;

(2) intermediate transportation fuel (boiling point of about 100-150° C. to about 360° C.) of greater than about 40 wt % and less than about 60 wt % in the intermediate composition; and (3) heavy ends product (boiling point of about 360° C. to about 490° C.) of less than about 30 wt % in the intermediate composition.

In some examples, the liquid portion of the renewable fuel intermediate composition may be further characterized as having greater than 90% of its carbon content being renewable carbon of biological (as opposed to fossil/mineral) origin as measured by standard C14 radiocarbon analysis. In some examples, the liquid portion of the renewable fuel intermediate composition may be further, or alternatively, characterized as having an oxygen content in the range of 1-4 wt %. In some examples, the liquid portion of the renewable fuel intermediate composition can be further, or alternatively, characterized as having an NMR branching index of greater than about 14%, wherein the NMR branching index is defined as the integral of the protons in the methyl region of 0.5 to 0.95 ppm as a percentage of the integral of the entire aliphatic proton resonances region of 0.5 to 2.1 ppm. In some examples, the liquid portion of the renewable fuel intermediate composition may be further, or alternatively, characterized as having about 10 wt % to about 50 wt % of oxygen containing molecules and/or at least about 50 wt % of oxygen-free hydrocarbons.

In some examples, the liquid portion of the renewable fuel intermediate composition can be further, or alternatively, characterized as having more than about 70 wt %, or more than about 80 wt %, of the oxygen in the product being in the form of ketone groups. Additionally, or alternatively, in some examples, the liquid portion of the renewable fuel intermediate composition may be characterized as having and at least about 10 wt % of the oxygen in the form of methyl ketones (Me-C(O)—R).

In some examples, the liquid portion of the renewable fuel intermediate composition can be further, or alternatively, characterized as having a total acid number (TAN) of less than 1.

In one nonlimiting example, an intermediate transportation (e.g., aviation) fuel portion of the liquid renewable fuel intermediate composition that is suitable for further processing into aviation fuel (e.g., jet fuel) may be characterized as:

(1) having greater than 90% of its carbon content being renewable carbon of biological (as opposed to fossil/mineral) origin as measured by standard C14 radiocarbon analysis;

(2) having a freezing point of less than about −15° C.;

(3) having less than about 10 wt % of its content comprising acyclic isoalkanes; and (4) having greater than about 15 wt %, (e.g., greater than about 20 wt %, or greater than about 30 wt %) of its content being saturated hydrocarbons with one or two rings (i.e., cycloalkanes).

In some examples, the intermediate transportation (e.g., aviation) fuel portion can be further, or alternatively, characterized as a composition in which the fraction of saturated hydrocarbons with one or two rings is at least twice the fraction of saturated acyclic hydrocarbons (i.e., traditional isoalkanes). In some examples, the intermediate transportation fuel portion can be further characterized as a composition in which the fraction of saturated hydrocarbons with one or two rings is larger than the fraction of saturated acyclic hydrocarbons (i.e., traditional isoalkanes).

As noted above, transportation fuels have to meet certain specifications. The cold flow properties of aviation fuels may be particularly challenging when making renewable fuels from lipid feedstock. For example, lipids may include linear molecular components which, in previously known methods, tend to hydrotreat to predominantly linear products, which may have relatively high pour, cloud, and freeze points. Consequently, renewable fuels produced using previously known methods may need extensive isomerization/dewaxing to meet the cold flow property specification. The specifications for aviation fuels, in particular, have a relatively low freeze point (i.e., −40° C. for Jet A, −47° C. for Jet A-1, and −60° C. for Jet B).

In some examples, intermediate compositions made using the present systems and methods may be used to produce a finished aviation fuel (particularly jet fuel, such as Jet A or Jet A-1). For example, it is expected that when the renewable fuel intermediate composition is hydroprocessed in a manner such as described with reference to FIGS. 1A-1B, 2A-2F, 3A-3F, and 4, the jet fuel range fraction of the finished aviation fuel will have a suitable freezing point. In one nonlimiting example, the finished aviation fuel may be characterized as having:

(1) a carbon content of which at least about 90% is derived from biological origin as determined by carbon-14 presence;

(2) a bromine index less than about 1000;

(3) an oxygen content less than about 1 wt %; and (4) a cycloalkane content having one or two rings, the cycloalkane content comprising greater than 15 wt %.

In some examples, the finished aviation fuel may be further, or alternatively, characterized as having a jet fuel component that has a freezing point less than about −15° C., or less than about −20° C., or less than about −30° C., or less than about −40° C., or about −40° C., or about −47° C.

In some examples, the finished aviation fuel may be further, or alternatively, characterized as having an n-alkane content of less than about 70 wt %, or less than about 60 wt %.

In some examples, the finished aviation fuel may be further, or alternatively, characterized as having an acyclic isoalkane content of less than about 15 wt %.

In some examples, the finished aviation fuel may be further, or alternatively, characterized as having a cycloalkane content that is at least about twice an acyclic isoalkane content as measured by weight percent of the finished aviation fuel.

In some examples, the finished aviation fuel may be further, or alternatively, characterized as having monoaromatic components greater than about 2 wt % and less than about 15 wt %.

Additional examples of finished aviation fuel will be elucidated below with reference to example data.

Working Examples

The following examples are intended to be purely illustrative, and not limiting of the present subject matter.

Example 1. Preparation of Renewable Fuel Intermediate Composition

A calcium oxide catalyst on alumina support was prepared by treating alumina with 17 wt % calcium acetate in water, drying at 120-140° C., and calcining at 480° C. The calcium oxide catalyst on alumina support had a packed density in the range of about 0.85 g/cc to about 0.95 g/cc; a pore volume in the range of about 0.44 to about 0.46 cc/g; a large pore content (pores>1000 Å) of about 0.33 cc/g to about 0.36 cc/g; an average pore diameter (D50) of about 130 Å to about 160 Å; and a surface area of about 80 m²/g to about 120 m²/g.

In the manner described with reference to FIGS. 5 and 6, the example lipid feedstock soybean oil (SBO) was flowed over a fixed-bed calcium oxide catalyst on an alumina support, in the presence of hydrogen, to respectively generate intermediate compositions. The reaction was performed at 900° F. (about 482° C.) at the following combinations of conditions: a liquid hourly space velocity (LHSV, oil feed basis) of about 1.05 $h^{-1}$ and a reaction vessel pressure (start of run) of 100 psig.

Table 1 below lists selected properties of the lipid feedstock (feeds), intermediate compositions (prod.) generated using such feedstock, and reaction conditions used during the catalytic conversion. The concentrations of impurities Ca, Fe, K, Mg, Na, Ni, P, Si, Sn, and V were measured using inductively coupled plasma-mass spectrometry (ICP). Where the less-than symbol (<) is used in Table 1, it means that the concentration of the impurity was below the instrument's resolution for that impurity in that run (e.g., that the impurity was undetectable).

TABLE 1

|  | SBO Feed | SBO Prod. |
|---|---|---|
| Reaction vessel Temp. (° F.) |  | 900 |
| Reaction vessel outlet pressure, start of run (psig) |  | 100 |
| LHSV, oil feed basis, ($h^{-1}$) |  | 1.05 |
| [Ca] (ppm) | 0.247 | <0.1 |
| [Fe] (ppm) | <0.21 | <0.2 |
| [K] (ppm) | <0.41 | <0.4 |
| [Mg] (ppm) | <0.11 | <0.1 |
| [Na] (ppm) | <0.21 | 3.7 |
| [Ni] (ppm) | <0.021 | <0.021 |
| [P] (ppm) | <0.21 | <0.21 |
| [Si] (ppm) | 0.21 | 1.02 |
| [Sn] (ppm) | <0.31 | <0.3 |
| [V] (ppm) | <0.11 | <0.1 |
| NMR Branching index* | 11% | 19% |
| Average carbon number per olefin | 12.7 | 23.1 |
| R—CH=CH—R' in olefins | 100% | 44% |
| R—CH=$CH_2$ in olefins | 0% | 50% |

*Refers to methyl 1H in total aliphatic 1H resonances

From Table 1, it may be understood that a lipid feedstock having impurities was catalytically converted under different conditions to an intermediate composition (also referred to herein as a renewable fuel intermediate composition).

The intermediate composition, and the feedstock from which the intermediate composition was derived, were characterized in a variety of ways. For example, the SBO feedstock had 100% of its olefins in the form of R—CH=CH—R' and 0% of its olefins in the form of R—CH=$CH_2$, while the SBO intermediate composition had 44% of its olefins in the form of R—CH=CH—R' and 50% of its olefins in the form of R—CH=$CH_2$. A relatively average carbon number per olefin is useful because higher carbon number per olefin means fewer double bonds and thus less hydrogen consumption and lower hydrogenation exotherm in subsequent hydrotreating. Additionally, the terminal olefins are formed by cracking reactions and reflect that longer chains have cracked. The fact that the total olefin count is not increasing as much reflects that some of the internal double bond from the feed appear to disappear and it is believed, without wishing to be bound by any theory, that is because there are cyclics formed (e.g., naphthenic products).

Additionally, from Table 1 it may be understood that the intermediate composition formed using catalytic processing of the lipid feedstock had significantly increased branching compared to its feedstock, as reflected by the NMR branching index. More specifically, the SBO feedstock had an NMR branching index of 11%, while the SBO intermediate composition had an NMR branching index of 19%, an increase of about 70%. It is useful for the NMR branching index of the intermediate composition to be higher than that of the respective feedstock because increased branching reflects that the product is not as linear as the feedstock. This is consistent with the formation of cyclic products, which improve coldflow properties of the hydrogenated final product. This is important, for example, because linear alkanes in the transportation fuel range have high melting points and freeze when cooled. Because of the higher branching of the present lipid feedstocks' intermediate compositions, the intermediate compositions may not require as severe a hydroisomerization and directly hydrogenated lipids do.

Additionally, from Table 1 it may be understood that the catalytic processing of the lipid feedstock reduced the levels of all measured impurities to below the ICP instrument's resolution. That is, catalytic processing such as described with reference to FIGS. 5 and 6 substantially removed all of the measured impurities, which included metals (Fe, Ni, Sn, V), a pseudometal (Si), alkali metals (Na, K), alkaline earth metals (Mg, Ca), and a nonmetal (P).

Boiling point curves for the SBO feedstock and SBO intermediate compositions were also obtained, to characterize the distribution of molecules respectively within them. Simulated distillation (SIMDIS) was determined according to ASTM D2887. Table 2 summarizes the SIMDIS data.

TABLE 2

| % distilled | SBO Feed wt % | SBO Prod. wt % |
|---|---|---|
| 0.5 | 846 | 317 |
| 5 | 938 | 320 |
| 10 | 1102 | 327 |
| 15 | 1110 | 342 |
| 20 | 1114 | 369 |
| 25 | 1118 | 406 |
| 30 | 1120 | 433 |
| 35 | 1122 | 481 |
| 40 | 1124 | 513 |
| 45 | 1125 | 539 |
| 50 | 1126 | 566 |
| 55 | 1127 | 595 |
| 60 | 1128 | 625 |
| 65 | 1129 | 659 |
| 70 | 1130 | 683 |
| 75 | 1132 | 718 |
| 80 | 1133 | 754 |
| 85 | 1135 | 793 |
| 90 | 1137 | 844 |
| 95 | 1141 | 906 |
| 99.5 | 1158 | 1034 |

From these data, it may be understood that the systems and methods described with reference to FIGS. 5 and 6 suitably may be used to generate intermediate compositions using lipid feedstocks.

Example 2. Preparation of finished aviation fuel

A 300-680° F. fraction of a renewable fuel intermediate composition prepared in a manner consistent with Example 1 was obtained using distillation. The fraction had the properties listed below in Table 3.

TABLE 3

300-680° F. fraction of renewable fuel intermediate composition

| Measurement (units) | Value |
|---|---|
| American Petroleum Institute (API) Gravity (°API) | 38.1 |
| Refractive index (RI) | 1.4577 |
| Molecular weight (MW, g/mol) | 158 |
| Sulfur (ppm) | 7.3 |
| Nitrogen (ppm) | 22.9 |
| Bromine number (g $Br_2$/100 g) | 51 |
| Carboxylic acids (mmol/g) | 0.1091 |
| Alkyl alcohol (mmol/g) | 0.0176 |
| Phenolic alcohols (mmol/g) | 0.3831 |
| Carbon content (wt %) | 86.44 |
| Hydrogen (1H NMR) (wt %) | 12.99 |
| Freeze point (° C.) | 5.7 |
| smoke point (° C.) | 23.3 |
| Flash point (° C.) | 62 |
| 100 point sim-dist. (wt %) | Sim-dist (° F.) |

TABLE 3-continued 300-680° F. fraction of renewable fuel intermediate composition

| Initial Boiling Point (IBP) | 257.5 |
|---|---|
| 1% | 275.6 |
| 5% | 322.2 |
| 10% | 348.2 |
| 30% | 446.7 |
| 50% | 522.6 |
| 70% | 592.9 |
| 90% | 675.7 |
| 95% | 893.8 |
| 96% | >1350 |
| 99% | >1350 |
| 99.5% | >1350 |

Figure 3E:
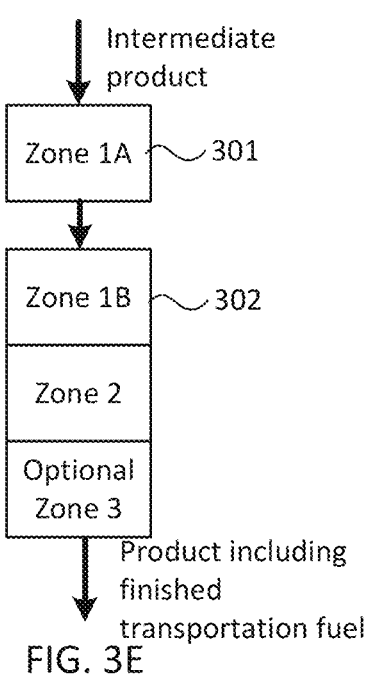
Figure 3F:
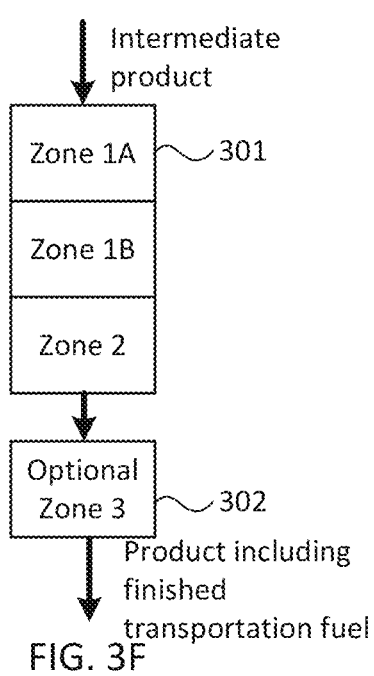
Figure 4:
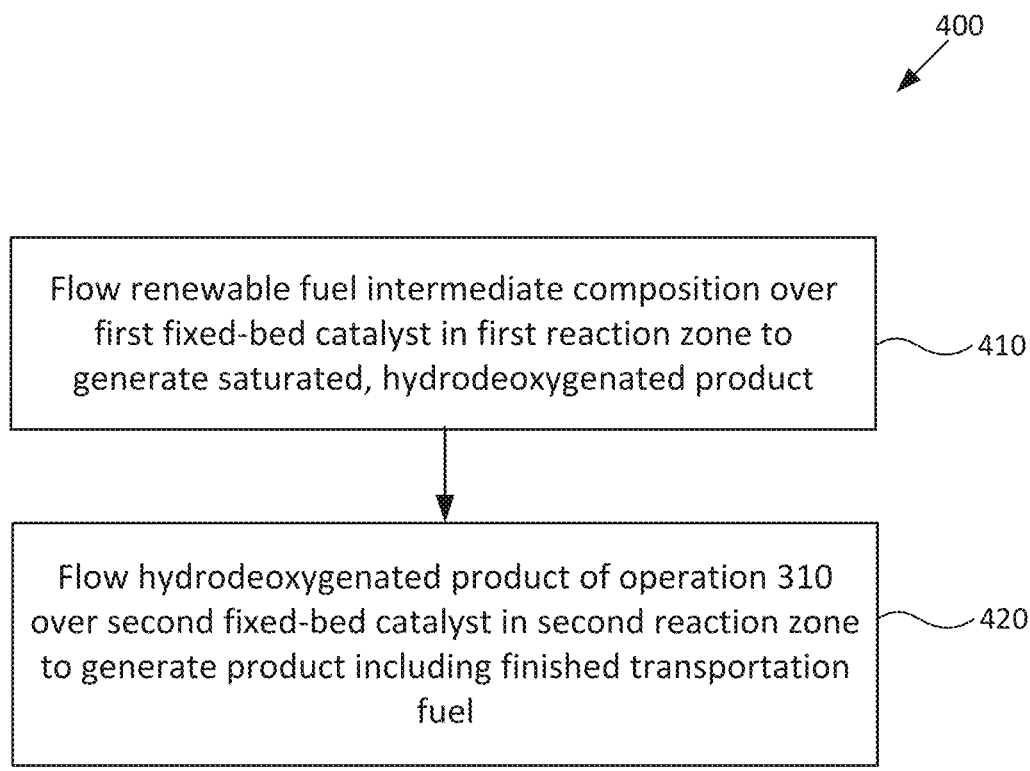
FIG. 4 illustrates an example flow of operations in a method for generating finished transportation fuel using a renewable fuel intermediate composition.

The fraction of the renewable fuel intermediate composition was processed in the manner described with reference to FIGS. 1B and 4, in first and second coupled reaction vessels configured such as illustrated in FIG. 3E. In a first reaction vessel (R1), 3.75 cubic centimeters (cc) of a commercial noble metal catalyst supported on alumina was used as a fixed-bed olefin hydrogenation catalyst in the first region of the first reaction zone; and in a second reaction vessel (R2), 3.75 cc of the same catalyst was used as a fixed-bed hydrodeoxygenation catalyst in a second region of the first reaction zone, 3.75 cc of a commercial, selective noble metal and zeolite dewaxing catalyst was used as a fixed-bed isomerization catalyst in the third reaction zone, and 0.75 cc of the same catalyst used in the first two reaction zones was used as a fixed-bed post-treatment catalyst in the fourth reaction zone. The first reaction vessel was coupled to the second reaction vessel using piping, without any intervening processing. The LHSV in the first, second, and third reaction zones was 0.8 $hr^{-1}$, and the LHSV in the fourth reaction zone was 4.0 $hr^{-1}$. Six runs were performed using different combinations of reaction conditions, summarized in Table 4.

TABLE 4

Run conditions for jet fuel production

| | Condition 1 | Condition 2 | Condition 3 | Condition 4 | Condition 5 | Condition 6 |
|---|---|---|---|---|---|---|
| Yield period | 0-546 hr | 570-666 hr | 690-834 hr | 858-882 hr | 906-978 hr | 1002-1146 hr |
| Pressure, psig | 900 | 900 | 900 | 900 | 900 | 900 |
| $PH_2$, psia | 795 | 795 | 795 | 795 | 795 | 795 |
| Overall LHSV, $hr^{-1}$ | 0.25 | 0.28 | 0.315 | 0.35 | 0.39 | 0.51 |
| $H_2$/oil, scf/bbl | 5000 | 5000 | 5000 | 5000 | 5000 | 5000 |
| R1 temperature, ° F. | 400 | 400 | 400 | 400 | 400 | 400 |
| R2 temperature, ° F. | 625 | 635 | 635 | 645 | 645 | 655 |

Under Condition 1, R1 was controlled at 400° F., R2 was at 625° F., system pressure was at 900 psig, hydrogen partial pressure was 795 psia at a hydrogen to oil ratio of 5000 scf/bbl. The overall liquid hourly space rate was 0.25 $hr^{-1}$, with 0.8 hr-space rate over the dewaxing catalyst layer because this catalyst was only a fraction of the entire load. The composite whole liquid product from start of run until run hour of 546 hr had a flash point of 40° C. and a freeze point of −41° C. Both properties met Jet A specs. Detailed product properties are summarized in Table 5. As may be understood from Table 5, the freeze point of the product may further be improved if the ~20 wt % 572° F.+ is fractionated out to meet 572° F. Jet A endpoint specs, e.g., in a manner such as will be described further below with reference to Table 6.

TABLE 5

Whole liquid product analysis for jet fuel production

| | Condition 1 | Condition 2 | Condition 3 | Condition 4 | Condition 5 | Condition 6 | JetA specs |
|---|---|---|---|---|---|---|---|
| Yield period | 0-546 hr | 570-666 hr | 690-834 hr | 858-882 hr | 906-978 hr | 1002-1146 hr | |
| Flash point, ° C. | 40 | 40 | 40 | 30 | | 54.5 | 38 |
| Freeze point, ° C. | −41 | −43.3 | −40 | −41.4 | −37.5 | −41.4 | −40 |
| Density @ 15° C., kg/L | | 792.2 | 792 | 792.2 | | | 770-840 |
| 550° F.-synthetic conversion, wt % Sim-dist | 22.41 | 25.72 | 22.59 | 24.72 | 21.37 | | |

TABLE 5-continued

Whole liquid product analysis for jet fuel production

|     | Condition 1 | Condition 2 | Condition 3 | Condition 4 | Condition 5 | Condition 6 | JetA specs |
|-----|-------------|-------------|-------------|-------------|-------------|-------------|------------|
| IBP | 156 | 145 | 155 | 154 | 154 | 155 | |
| 5%  | 270 | 261 | 269 | 265 | 269 | 261 | |
| 10% | 308 | 304 | 306 | 304 | 306 | 305 | |
| 30% | 407 | 404 | 406 | 406 | 407 | 405 | |
| 50% | 490 | 486 | 489 | 489 | 491 | 488 | |
| 70% | 557 | 553 | 558 | 556 | 560 | 553 | |
| 90% | 620 | 618 | 621 | 620 | 623 | 619 | |
| 95% | 646 | 643 | 648 | 647 | 651 | 645 | |
| FBP | 712 | 699 | 720 | 717 | 728 | 716 | |

The activation energy of the isomerization reaction was calculated to be approximately 29.8 kcal/mol. This activation energy was used to estimate the amount by which the feed throughput (space rate) could be increased, compensated by reaction temperature while maintaining the same product conversion and product quality.

More specifically, under Condition 2 and Condition 3, R1 was controlled at 400° F., R2 was raised to 635° F. from 625° F. (Condition 1). The overall liquid hourly space rate was 0.28 hr$^{-1}$ (Condition 2) and 0.315 hr$^{-1}$ (Condition 3) respectively. Product 550° F.–synthetic conversion and product quality analysis is listed in Table 5, which indicates that whole liquid product met all specs under the elevated temperature of 635° F. at a space rate 25% higher than that in Condition 1.

The space rate was therefore further increased to 0.35 hr$^{-1}$ (Condition 4) and 0.39 hr$^{-1}$ (Condition 5), while R2 catalyst temperature was raised to 645° F. under both Condition 4 and Condition 5. Product properties as shown in Table 5 again met Jet A specs.

Under Condition 6, the space rate was raised to 0.51 hr$^{-1}$ while maintaining the same hydrogen partial pressure and hydrogen to oil ratio. As shown in Table 5, the whole liquid product had a freeze point of −41.4° C. and a flash point of 54.5° C. at R2 catalyst temperature of 655° F. This product quality again met Jet A specs. Note that jet productivity doubled to 0.5 hr$^{-1}$ from 0.25 hr$^{-1}$ during start of run by elevating R2 temperature from 625° F. to about 650° F., which was still a healthy catalyst temperature.

Jet fractions were acquired after distilling off the 572° F.+ fraction from the combined whole liquid products under Condition 1, and the pooled products from Condition 4, Condition 5, and Condition 6. For the 572° F.+ fraction from the product formed using Condition 1, the recovery of Jet fraction (572° F.–fraction) was 74.6 wt % or 81.53 vol %. Except for flash point, jet fraction properties from Condition 1 met both Jet A and Jet A-1 specs. The recovery of Jet fraction (572° F.–fraction) was 76.77 wt % or 80.00 vol % for the pooled products of Conditions 4-6. The analysis of the jet fraction was shown in Table 6. As shown in Table 6, jet fraction properties for the pooled products from Conditions 4, 5, and 6 met both Jet A and Jet A-1 specs.

TABLE 6

Jet fraction properties

|     | Condition 1 | Condition 4-6 | Jet A specs | Jet A-1 specs |
|-----|-------------|---------------|-------------|---------------|
| Yield period | 0-546 hr | 858-1146 hr | | |
| Flash point, ° C. | 31 | | 38 | 38 |
| Freeze point, ° C. | −49.7 | −47.1 | −40 | −47 |

TABLE 6-continued

Jet fraction properties

|     | Condition 1 | Condition 4-6 | Jet A specs | Jet A-1 specs |
|-----|-------------|---------------|-------------|---------------|
| Smoke point, mm | 44 | | 18 | 19 |
| Density @ 15° C., kg/L | 780.6 | 784.7 | 770-840 | 775-840 |
| Distillation, ° F. | | | | |
| Initial boiling point, Max | | | 401 | 401 |
| End boiling point | | | 572 | 572 |
| D86 | | | | |
| IBP | 256.73 | 258.22 | | |
| EV5% | 256.73 | 314.41 | | |
| EV10% | 317.71 | 338.3 | | |
| EV20% | 342.91 | 366.42 | | |
| EV30% | 365.2 | 391.91 | | |
| EV40% | 389.69 | 417.3 | | |
| EV50% | 414.14 | 437.66 | | |
| EV60% | 440.01 | 460.05 | | |
| EV70% | 467 | 480.8 | | |
| EV80% | 491.7 | 499.97 | | |
| EV90% | 513.79 | 520.54 | | |
| EV95% | 525.72 | 533.29 | | |
| EVEPT | 539.18 | 540.6 | | |
| Sim-dist | | | | |
| IBP | 162.5 | 162.8 | | |
| 5% | 258.2 | 260.6 | | |
| 10% | 287.9 | 304.8 | | |
| 30% | 349.5 | 379.4 | | |
| 50% | 412.9 | 444.5 | | |
| 70% | 488.3 | 506.8 | | |
| 90% | 548.6 | 553.2 | | |
| 95% | 563.7 | 566.2 | | |
| FBP | 602.5 | 603.3 | | |

The olefin saturation activity of the catalyst in the first reaction zone (R1) was separately tested after cooling down R2 to room temperature (RT) and bypassing R2. The test was conducted by maintaining the same end of run feed rate (0.51 hr$^{-1}$ space rate), hydrogen partial pressure (795 psia) and hydrogen to oil ratio (5000 scf/bbl) while stepping down R1 catalyst temperature from 400° F. to 250° F. Olefin saturation activity was gauged by product Bromine number. As shown in Table 7, R1-only product Bromine number was 4 g Br$_2$/100 g at 400° F., as compared to 51 g Br$_2$/100 g in the feed. Upon reducing R1 catalyst temperature to 350° F., then 300° F., and finally 250° F., the product Bromine index increased to 6 g Br$_2$/100 g, 10 g Br$_2$/100 g and 16 g Br$_2$/100 g respectively. This result indicates that even at as low as 300° F. catalyst temperature, ICR425 catalyst in R1 fulfills greater than about 80% olefin saturation, which provides a healthy start of run temperature to reduce or minimize the risk of reaction runaway caused by massive heat release from olefin saturation as may occur when directly saturating double bonds of a lipid feedstock.

TABLE 7

Run conditions and product specs for olefin saturation

| | Condition 1 | Condition 2 | Condition 3 | Condition 4 |
|---|---|---|---|---|
| Yield period | 1171-1194 hr | 1218-1242 hr | 1266-1290 hr | 1314-1338 |
| Pressure, psig | 900 | 900 | 900 | 900 |
| PH$_2$, psia | 795 | 795 | 795 | 795 |
| Overall LHSV (R1 only), hr$^{-1}$ | 1.6 | 1.6 | 1.6 | 1.6 |
| H$_2$/oil, scf/bbl | 5000 | 5000 | 5000 | 5000 |
| R1 temperature, ° F. | 400 | 350 | 300 | 250 |
| Product Bromine number, g Br$^2$/100 g | 4 | 6 | 10 | 16 |

From the foregoing, it may be understood that systems and methods such as described with reference to FIGS. 1A-1B, 2A-2F, 3A-3F, and 4 suitably may be used to generate finished jet fuel under a wide variety of reaction conditions.

Additional Comments

While various illustrative embodiments of the invention are described above, it will be apparent to one skilled in the art that various changes and modifications can be made therein without departing from the invention. The appended claims are intended to cover all such changes and modifications that fall within the true spirit and scope of the invention.

What is claimed is:

1. A method of generating finished transportation fuel, the method comprising:
    (a) flowing a renewable fuel intermediate composition over a first fixed-bed catalyst in a first reaction zone to generate a saturated, hydrodeoxygenated product, a liquid portion of the renewable fuel intermediate composition being characterized as having more than about 70 wt % of the oxygen being within ketone groups; and
    (b) flowing the saturated, hydrodeoxygenated product of operation (a) over a second fixed-bed catalyst in a second reaction zone to generate an isomerized product comprising the finished transportation fuel,
    wherein operations (a) and (b) are performed adiabatically, and wherein a reaction exotherm from operation (a) provides sufficient heat to conduct operation (b).

2. The method of claim 1, further comprising distilling the product comprising the finished transportation fuel to obtain a fraction that consists essentially of the finished transportation fuel.

3. The method of claim 1, wherein the first and second reaction zones are commonly located in a first reaction vessel.

4. The method of claim 1, wherein the first and second reaction zones are located in different reaction vessels than one another and are directly coupled to one another via piping, without any intervening processing.

5. The method of claim 1, wherein:
    the first reaction zone comprises a first region having the first fixed-bed catalyst under a first set of reaction conditions and a second region having the first fixed-bed catalyst under a second set of reaction conditions.

6. The method of claim 1, wherein the first and second reaction zones are at substantially the same pressure as one another, or wherein the first and second reaction zones are at different temperatures than one another, or wherein liquid hourly space rates in the first and second reaction zones are different than one another.

7. The method of claim 1, wherein a temperature of the renewable fuel intermediate composition entering the first reaction zone is about 50-600° F. lower than a temperature of the saturated, hydrodeoxygenated product of operation (a) entering the second reaction zone.

8. The method of claim 1, wherein a temperature of the renewable fuel intermediate composition entering the first reaction zone is about 100° F. to about 300° F.

9. The method of claim 1, wherein the product comprising the finished transportation fuel has a flash point of more than about 38° C., or wherein the product comprising the finished transportation fuel has a freeze point of less than about −40° C., or wherein the finished transportation fuel has a freeze point of less than about −40° C.

10. The method of claim 1, wherein the finished transportation fuel comprises at least about 40 wt % of the product comprising the finished transportation fuel.

11. The method of claim 1, wherein the renewable fuel intermediate composition consists essentially of a distillation fraction having a boiling point ranging from about 200° F. to about 700° F.

12. The method of claim 1, wherein the first fixed-bed catalyst used in operation (a) saturates at least 80% of olefins in the renewable fuel intermediate composition.

13. The method of claim 1, wherein the first fixed-bed catalyst used in operation (a) removes at least 70 wt % of oxygen from the renewable fuel intermediate composition.

14. The method of claim 1, wherein at least a portion of operation (a) is performed at a temperature between about 200° F. and about 700° F., or wherein at least a portion of operation (a) is performed at a pressure between about 750 psig and about 1200 psig.

15. The method of claim 1, wherein the second fixed-bed catalyst used in operation (b) comprises a fixed-bed isomerization catalyst.

16. The method of claim 1, further comprising flowing the product of operation (b) over a fixed-bed post-treatment catalyst in a third reaction zone.

17. The method of claim 1, further comprising generating the renewable fuel intermediate composition.

18. The method of claim 17, wherein generating the renewable fuel intermediate composition comprises:
    flowing a lipid feedstock into a second reaction vessel comprising a metal oxide catalyst on an oxide support;
    using the catalyst in the second reaction vessel to catalytically convert the lipid feedstock to an intermediate mixture; and
    distilling the intermediate mixture to obtain a fraction that primarily comprises the renewable fuel intermediate composition.

19. A system for generating finished transportation fuel, the system comprising:
    a first reaction zone comprising a first fixed-bed catalyst configured to adiabatically convert a renewable fuel intermediate composition into a saturated, hydrodeoxygenated product; and
    a second reaction zone comprising a second fixed-bed catalyst configured to adiabatically convert the saturated, hydrodeoxygenated product into an isomerized product comprising the finished transportation fuel, wherein:
    a liquid portion of the renewable fuel intermediate composition is characterized as having more than about 70 wt % of the oxygen being within ketone groups; and a reaction exotherm from adiabatically converting the renewable fuel intermediate composition into the saturated, hydrodeoxygenated product provides sufficient heat to convert the saturated, hydrodeoxygenated product into the isomerized product comprising the finished transportation fuel.

20. The system of claim 19, further comprising a distillation column configured to distill the product comprising the finished transportation fuel to obtain a fraction that consists essentially of the finished transportation fuel.

21. The system of claim 19, wherein the first, and second reaction zones are commonly located in a first reaction vessel.

22. The system of claim 19, wherein the first and second reaction zones are located in different reaction vessels than one another and are directly coupled to one another via piping, without any intervening processing.

23. The system of claim 19, wherein the first reaction zone comprises a first region having the first fixed-bed catalyst under a first set of reaction conditions, and a second region having the first fixed-bed catalyst under a second set of reaction conditions.

24. The system of claim 19, wherein the first and second reaction zones are all at substantially the same pressure as one another, or wherein the first and second reaction zones are at different temperatures than one another, or wherein liquid hourly space rates in the first and second reaction zones are different than one another.

25. The system of claim 19, wherein a temperature of the renewable fuel intermediate composition entering the first reaction zone is about 50-600° F. lower than a temperature of the saturated, hydrodeoxygenated product entering the second reaction zone.

26. The system of claim 19, wherein a temperature of the renewable fuel intermediate composition entering the first reaction zone is about 100° F. to about 300° F.

27. The system of claim 19, wherein the first fixed-bed catalyst in the first reaction zone is configured to saturate at least 80% of olefins in the renewable fuel intermediate composition.

28. The system of claim 19, wherein the first fixed-bed catalyst in the first reaction zone is configured to remove at least 70 wt % of oxygen from the renewable fuel intermediate composition.

29. The system of claim 19, wherein at least a portion of the first reaction zone is at a temperature between about 200° F. and about 700° F., or wherein at least a portion of the first reaction zone is at a pressure between about 750 psig and about 1200 psig.

30. The system of claim 19, wherein the second fixed-bed catalyst in the second reaction zone comprises a fixed-bed isomerization catalyst.

31. The system of claim 19, further comprising a third reaction zone comprising a fixed-bed post-treatment catalyst.

32. The system of claim 19, further comprising a subsystem configured to generate the renewable fuel intermediate composition.

33. The system of claim 32, wherein the subsystem comprises:
    a second reaction vessel comprising a metal oxide catalyst on an oxide support and configured to catalytically convert the lipid feedstock to an intermediate mixture; and
    a distillation column configured to distill the intermediate mixture to obtain a fraction that primarily comprises the renewable fuel intermediate composition.

* * * * *